US012681128B2

(12) United States Patent
Li et al.

(10) Patent No.: US 12,681,128 B2
(45) Date of Patent: Jul. 14, 2026

(54) METHOD FOR CONSTRUCTING INDOOR MAP AND RELATED APPARATUS

(71) Applicant: HUAWEI TECHNOLOGIES CO., LTD., Guangdong (CN)

(72) Inventors: Zhi Li, Xi'an (CN); Dandan Zeng, Beijing (CN); Yongliang Wang, Wuhan (CN); Yun Zhang, Shenzhen (CN); Fangsong Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 126 days.

(21) Appl. No.: 18/423,076

(22) Filed: Jan. 25, 2024

(65) Prior Publication Data

US 2024/0159857 A1 May 16, 2024

Related U.S. Application Data

(63) Continuation of application No. PCT/CN2022/107579, filed on Jul. 25, 2022.

(30) Foreign Application Priority Data

Jul. 28, 2021 (CN) .......................... 202110859780.5

(51) Int. Cl.
*G01S 5/02* (2010.01)

(52) U.S. Cl.
CPC ................................ *G01S 5/02526* (2020.05)

(58) Field of Classification Search
CPC .................................................. G01S 5/02526
See application file for complete search history.

(56) References Cited

U.S. PATENT DOCUMENTS 9,918,180 B2 * 3/2018 Ribbich ................. H04W 4/33
10,375,517 B2 8/2019 Shen et al.
(Continued)

FOREIGN PATENT DOCUMENTS

CN 105263113 A 1/2016
CN 109819406 A 5/2019

OTHER PUBLICATIONS

Gao Ruipeng et al: "Multi-Story Indoor Floor Plan Reconstruction via Mobile Crowdsensing", IEEE Transactions On Mobile Computing, IEEE Service Center, Los Alamitos, CA, US, vol. 15, No. 6, Jun. 1, 2016 (Jun. 1, 2016), pp. 1427-1442, XP011611485.
(Continued)

*Primary Examiner* — Scott A Browne
*Assistant Examiner* — Izcalli Rios-Aguirre
(74) *Attorney, Agent, or Firm* — WOMBLE BOND DICKINSON (US) LLP

(57) ABSTRACT

This application disclose a method for constructing an indoor map. The method includes: obtaining a plurality of first tracks and a second track, where each first track is a flat-layer track located on an indoor horizontal layer, the second track is a cross-layer track located between different indoor horizontal layers, and a first wireless signal information similarity between each first track point of the first track and each second track point is less than a first threshold; and performing layering on the plurality of first tracks based on a second wireless signal information similarity between the plurality of first tracks, to obtain a layering result, where the layering result may be used to construct an indoor map.

20 Claims, 17 Drawing Sheets

(56) References Cited

U.S. PATENT DOCUMENTS

| | | | | |
|---|---|---|---|---|
| 2014/0278060 A1* | 9/2014 | Kordari | ............... | G01C 21/383 |
| | | | | 701/422 |
| 2014/0378166 A1* | 12/2014 | Hong | ................... | H04W 4/023 |
| | | | | 455/456.3 |
| 2015/0172872 A1* | 6/2015 | Alsehly | ................ | G01S 5/0236 |
| | | | | 455/457 |
| 2015/0249907 A1* | 9/2015 | Gupta | ................... | H04W 4/043 |
| | | | | 455/456.1 |
| 2016/0371394 A1* | 12/2016 | Shahidi | ............... | H04B 17/318 |
| 2020/0249026 A1* | 8/2020 | Ivanov | ...................... | G01S 5/14 |
| 2022/0196784 A1* | 6/2022 | Wirola | ............... | G01S 5/02521 |

OTHER PUBLICATIONS

Alzantot Moustafa et al: "CrowdInside: Automatic Construction of Indoor Floorplans", Proceedings of the 20TH International Conference On Aovances On Geographic Information Systems, ACM, 2 Penn Plaza, Suite 701 New York NY 10121-0701, USA, Nov. 6, 2012 (Nov. 6, 2012), pp. 99-108, XP058010905.

* cited by examiner

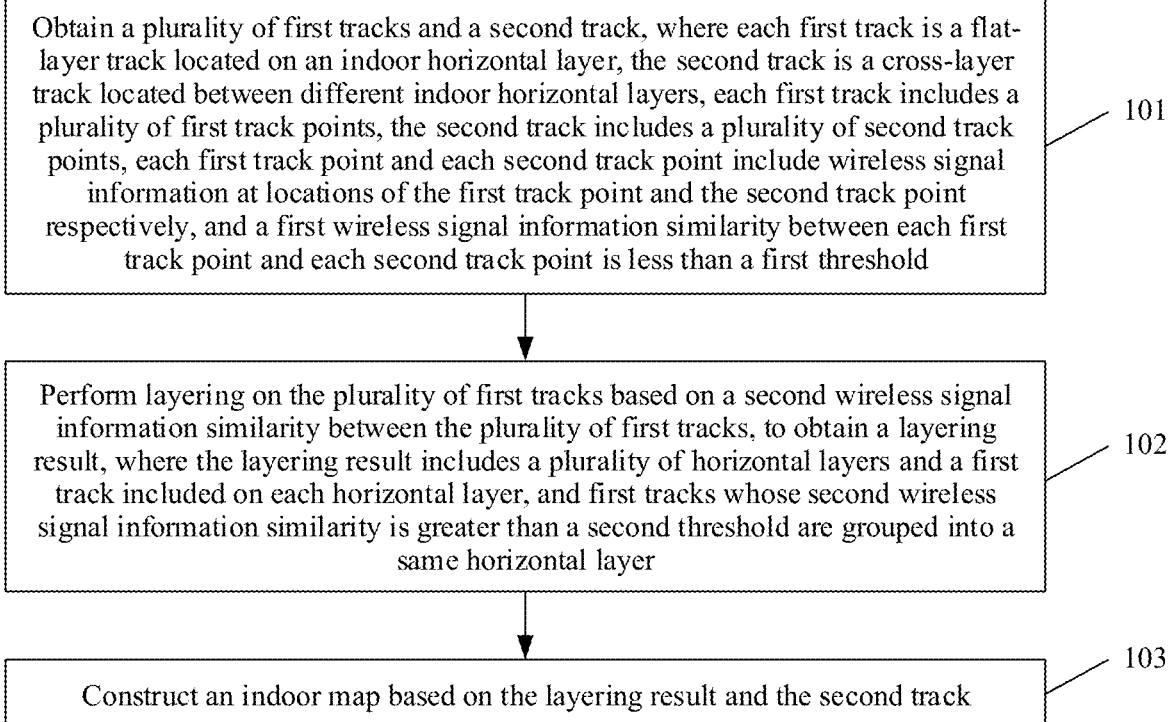

Obtain a plurality of first tracks and a second track, where each first track is a flat-layer track located on an indoor horizontal layer, the second track is a cross-layer track located between different indoor horizontal layers, each first track includes a plurality of first track points, the second track includes a plurality of second track points, each first track point and each second track point include wireless signal information at locations of the first track point and the second track point respectively, and a first wireless signal information similarity between each first track point and each second track point is less than a first threshold          101

Perform layering on the plurality of first tracks based on a second wireless signal information similarity between the plurality of first tracks, to obtain a layering result, where the layering result includes a plurality of horizontal layers and a first track included on each horizontal layer, and first tracks whose second wireless signal information similarity is greater than a second threshold are grouped into a same horizontal layer          102

Construct an indoor map based on the layering result and the second track          103

FIG. 1

3D-Outdoor fingerprint band

METHOD FOR CONSTRUCTING INDOOR MAP AND RELATED APPARATUS

CROSS-REFERENCE TO RELATED APPLICATIONS

This application is a continuation of International Application No. PCT/CN2022/107579, filed on Jul. 25, 2022, which claims priority to Chinese Patent Application No. 202110859780.5, filed on Jul. 28, 2021. The disclosures of the aforementioned applications are hereby incorporated by reference in their entireties.

TECHNICAL FIELD

This application relates to the field of computers, and in particular, to a method for constructing an indoor map and a related apparatus.

BACKGROUND

As location services in daily use have gradually become popular and common, the location-based positioning services become an increasingly indispensable basic need for people. However, most people's daily activities happen indoors, and use of terminals and data connections are mostly performed indoors. In addition, people's daily activity information is usually related to locations and time. Therefore, a requirement for the location services in a mobile internet era is increasing.

The core of mobile services is to accurately obtain a location of a smart device in real time, and indoor positioning is a necessary basic technology in two application fields: travel and convenient life. Indoor positioning is required in scenarios such as shopping malls, underground garages, hospitals, and airports to enable smarter mobile service applications. Indoor positioning is a core technology of navigation, social networking, and advertising applications. There are millions of shopping malls and airports around the world that need to deploy indoor positioning technologies.

Crowdsourcing data is triggered in a random mode without being perceived by a user. Therefore, originally collected crowdsourcing data is indoor and outdoor data, a flat-layer track, a cross-layer track, and various behavioral states. The difficulty of track layering lies in mixed layers of tracks. In an indoor scenario, such as shopping malls, there are a large number of elevators, escalators, and staircases between floors and a large hollow area. Due to these factors, wireless signals such as Wi-Fi signals are transmitted between the floors without obstacles. Therefore, a fingerprint similarity between tracks of adjacent floors in these areas cannot be distinguished. For example, track points on both sides of an escalator are not blocked. Therefore, a case in which track points on a flat-layer track at two ends of a cross-layer track are located on different plane layers and wireless signal information is very similar may occur. If layering of the flat-layer track is performed based on these track points, tracks on different planes may be incorrectly identified as tracks on a same layer.

SUMMARY

According to a first aspect, this application provides a method for constructing an indoor map. The method includes:

obtaining a plurality of first tracks and a second track, where each first track is a flat-layer track located on an indoor horizontal layer, the second track is a cross-layer track located between different indoor horizontal layers, each first track includes a plurality of first track points, the second track includes a plurality of second track points, each first track point and each second track point include wireless signal information at locations of the first track point and the second track point respectively, and a first wireless signal information similarity between each first track point and each second track point is less than a first threshold.

The flat-layer track herein may be understood as a track on a horizontal plane, for example, a track on an indoor horizontal floor; and the cross-layer track may be understood as a track between indoor planes, for example, a track on an escalator or an elevator.

The wireless signal information herein may refer to a signal that can be received in an indoor area, and does not include GPS information. For example, the wireless signal information may include but is not limited to Wi-Fi, Bluetooth, a signal from a base station cell, fine time measurement (FTM), ultra-wideband (UWB), a geomagnetic field, and the like.

The first track point and the second track point may include the wireless signal information at the locations of the first track point and the second track point respectively. The wireless signal information may indicate strength of a wireless signal received at the location of the track point and a network device that sends the wireless signal. When the wireless signal information included in the track point on the flat-layer track is similar to the wireless signal information included in the second track point, it may be considered that a physical location of the track point on the flat-layer track is close to or overlaps a physical location of the second track point. In this embodiment of this application, a track point that is on the flat-layer track and whose wireless signal information is similar to the wireless signal information included in the second track point needs to be removed (or marked, where the mark may indicate that the wireless signal information is similar and the track point does not participate in subsequent layering of the flat-layer track), and all first track points participating in the subsequent layering meet that a first wireless signal information similarity between each first track point and each second track point is less than the first threshold.

The first wireless signal information similarity between the first track point and the second track point may be related to a coincidence degree of network device identifiers included in the first track point and the second track point. When only a small quantity (or proportion) of network device identifiers are overlapped (for example, the identifiers do not overlap at all, or only one, two, or three identifiers overlap, or only less than 10, 20, or 30 percent of identifiers overlap) in the network device identifiers included in the first track point and the second track point, it may be considered that the first wireless signal information similarity between the first track point and the second track point is less than the first threshold.

The first wireless signal information similarity between the first track point and the second track point may further be related to a signal strength similarity of wireless signals included in the first track point and the second track point. When the first track point and the second track point include a same network device identifier, the first wireless signal information similarity between the first track point and the second track point may further be related (for example, may be positively correlated) to a wireless signal strength similarity of network devices corresponding to the same network device identifier.

For example, the first wireless signal information similarity between the first track point and the second track point may be quantized based on a similarity value, and the value is related (for example, positively correlated) to a coincidence degree of the network device identifiers included in the first track point and the second track point, and is further related (for example, positively correlated) to wireless signal strength of the network devices corresponding to the same network device identifier included in the first track point and the second track point. When the similarity value is less than the first threshold, it may be considered that the first wireless signal information similarity between the first track point and the second track point is less than the first threshold.

The first threshold may be set based on experience, provided that the first threshold can represent that the wireless signal information of the first track point and the second track point is very similar, so that precision of subsequent layering of the flat-layer track can be affected. A value of the first threshold is not limited in this application.

In an embodiment, the method further includes: performing layering on the plurality of first tracks based on a second wireless signal information similarity between the plurality of first track points included in the plurality of first tracks, to obtain a layering result, where the layering result includes a plurality of horizontal layers and a first track included on each horizontal layer, and first tracks whose second wireless signal information similarity is greater than a second threshold are grouped into a same horizontal layer; and constructing an indoor map based on the layering result.

In an embodiment, the second wireless signal information similarity herein is a wireless signal similarity between tracks, for example, may be calculated by using a coincidence degree of network device identifiers included in track points of tracks and a wireless signal strength similarity.

Crowdsourcing data is triggered in a random mode without being perceived by a user. Therefore, originally collected crowdsourcing data is indoor and outdoor data, a flat-layer track, a cross-layer track, and various behavioral states. The difficulty of track layering lies in mixed layers of tracks. In an indoor scenario, such as shopping malls, there are a large number of elevators, escalators, and staircases between floors and a large hollow area. Due to these factors, radio frequency signals such as Wi-Fi signals are transmitted between the floors without obstacles. Therefore, a fingerprint similarity between tracks of adjacent floors in these areas cannot be distinguished, resulting in layer mixing. In this embodiment of this application, because wireless signals of the first track points participating in the layering and the track points of the cross-layer track differ greatly, that is, track points near the cross-layer track are not used for layering, tracks on different planes are not incorrectly identified as tracks on a same layer, thereby improving accuracy of track layering.

In this embodiment of this application, a server may obtain a plurality of indoor tracks based on crowdsourcing data reported by a terminal. Each track point in the indoor track may include sensor information and a time (the time may be understood as a time of collecting a track point, or referred to as a time of collecting corresponding sensor information) at the location of the track point, and whether a track is a flat-layer track or a cross-layer track may be identified by using the sensor information of the track point.

In an embodiment, the sensor information may be acceleration information, so that the server can identify a high-confidence cross-layer track (the second track) by using the acceleration information included in the track point.

Specifically, it may be determined that a track whose acceleration information meets the following condition is the second track: an acceleration of each track point in the track in a time sequence of the time changes from a first state to a second state and then to a third state, where the first state is an increased state in which a change rate is greater than a threshold, the second state is a steady state in which the change rate is less than the threshold, and the third state is a decreased state in which the change rate is greater than the threshold; or the first state is a decreased state in which a change rate is greater than a threshold, the second state is a steady state in which the change rate is less than the threshold, and the third state is an increased state in which the change rate is greater than the threshold.

The change rate herein may be understood as a change value of the acceleration in a unit time, for example, may be a slope value on a curve of the acceleration changing with time.

The time sequence herein may be a forward time sequence or a reverse time sequence along the time included in each second track point. For example, the plurality of track points include a track point 1, a track point 2, a track point 3, a track point 4, a track point 5, a track point 6, a track point 7, a track point 8, a track point 9, and a track point 10. A time at which the sensor information is collected in the track point 1 is 0.005, a time at which the sensor information is collected in the track point 2 is 0.010, a time at which the sensor information is collected in the track point 3 is 0.015, a time at which the sensor information is collected in the track point 4 is 0.02, a time at which the sensor information is collected in the track point 5 is 0.025, a time at which the sensor information is collected in the track point 6 is 0.03, a time at which the sensor information is collected in the track point 7 is 0.035, a time at which the sensor information is collected in the track point 8 is 0.04, a time at which the sensor information is collected in the track point 9 is 0.045, and a time at which the sensor information is collected in the track point 10 is 0.05. In this case, the acceleration of each second track point in the second track in the time sequence of the time may be an acceleration in a sequence of the track point 1, the track point 2, the track point 3, the track point 4, the track point 5, the track point 6, the track point 7, the track point 8, the track point 9, and the track point 10; or an acceleration in a sequence of the track point 10, the track point 9, the track point 8, the track point 7, the track point 6, the track point 5, the track point 4, the track point 3, the track point 2, and the track point 1.

Refer to FIG. 2, when a user crosses floors, for example, by taking an escalator or an elevator, an accelerometer has an obvious change in an upward and downward process. In the upward process, the accelerometer has an obvious process of first increasing, then being steady, and finally decreasing, while the downward process is the opposite. Therefore, a cross-layer track can be effectively identified by detecting a change characteristic of the acceleration.

Each second track point in the first track determined in the foregoing manner includes the acceleration information collected at a location of the second track point, and along a direction of the second track, accelerations of the plurality of second track points change from a first state to a second state and then to a third state. The first state is an increased state in which a change rate is greater than a threshold, the second state is a steady state in which the change rate is less than the threshold, and the third state is a decreased state in which the change rate is greater than the threshold; or the first state is a decreased state in which a change rate is greater than a threshold, the second state is a steady state in which the change rate is less than the threshold, and the third state is an increased state in which the change rate is greater than the threshold.

In an embodiment, the wireless signal information indicates strength of a wireless signal received at a location and an identifier of a network device that sends the wireless signal.

The wireless signal strength may also be referred to as received signal strength (RSS), and specifically refers to a received wideband power on a channel bandwidth received by a terminal, in a unit of dBm. The value is a relative value, and is related to receive antenna quality of the terminal, surrounding environmental link blocking, a distance between the terminal and a signal transmit source, and the like.

In an embodiment, the obtaining a plurality of first tracks includes: obtaining a plurality of initial tracks, where each initial track includes a plurality of track points, each track point includes wireless signal information received at a location of the track point, and each initial track is a flat-layer track located on the indoor horizontal layer; and determining that a track point, among the plurality of track points included in the plurality of initial tracks, whose wireless signal information similarity to that of each second track point is less than the first threshold is the first track point, to obtain the first track.

After the first track point is determined, the first track point may be marked. The mark may indicate that the track point is used during subsequent layering of the flat-layer track, and other track points other than the first track point in the initial track are removed, or are not marked.

After the first track point is determined, other track point other than the first track point in the initial track may be removed, or marked. The mark may indicate that the track point is not used during subsequent layering of the flat-layer track, or may indicate, by using another operation, that the track point is not used during subsequent layering of the flat-layer track. This is not limited herein.

Because wireless signals of the first track points participating in the layering and the track points of the cross-layer track differ greatly, that is, track points near the cross-layer track are not used for layering, tracks on different planes are not incorrectly identified as tracks on a same layer, thereby improving accuracy of track layering.

In an embodiment, the method further includes:

obtaining a third track point, where the third track point includes wireless signal information and GPS information at a location of the third track point, a wireless signal information similarity between the third track point and a target track point in the plurality of first track points is greater than a third threshold, the GPS information indicates an absolute location of the target track point, and the target track point further includes a relative location in the plurality of first tracks; and determining a location conversion relationship based on the absolute location and the relative location, and determining absolute locations of the plurality of first track points based on the location conversion relationship.

The wireless signal information similarity between the third track point and the second track point may be related to a coincidence degree of network device identifiers included in the third track point and the first track point. When only a small quantity (or proportion) of network device identifiers are overlapped (for example, the identifiers do not overlap at all, or only one, two, or three identifiers overlap, or only less than 10, 20, or 30 percent of identifiers overlap) in the network device identifiers included in the third track point and the first track point, it may be considered that the wireless signal information similarity between the third track point and the first track point is less than third threshold.

The wireless signal information similarity between the third track point and the first track point may further be related to a signal strength similarity of wireless signals included in the third track point and the first track point. When the third track point and the first track point include a same network device identifier, the wireless signal information similarity between the third track point and the first track point may further be related (for example, may be positively correlated) to a wireless signal strength similarity of network devices corresponding to the same network device identifier.

For example, the wireless signal information similarity between the third track point and the first track point may be quantized based on a similarity value, and the value is related (for example, positively correlated) to a coincidence degree of the network device identifiers included in the third track point and the first track point, and is further related (for example, positively correlated) to wireless signal strength of the network devices corresponding to the same network device identifier included in the third track point and the first track point. When the similarity value is greater than the third threshold, it may be considered that the wireless signal information similarity between the third track point and the first track point is greater than the third threshold.

The third threshold may be set based on experience. It may be basically considered that the third track point and the first track point completely overlap or basically overlap, provided that the third threshold can represent that the wireless signal information of the third track point and the first track point is very similar. A value of the third threshold is not limited in this application.

The GPS information herein indicates an absolute location of the target track point, and may be understood as that the GPS information may indicate an absolute location of the third track point. Because the wireless signal information of the third track point and the target track point is very similar, it may be considered that a physical location of the third track point and a physical location of the target track point completely overlap or basically overlap. In this case, the GPS information may be used as the absolute location of the target track point. For example, the absolute location of the GPS information may be directly assigned to the target track point.

The GPS information may include absolute location information (for example, geographical coordinates), and may further include uncertainty of the absolute location information (because the third track point may not strictly overlap the first track point, the uncertainty of the GPS information may be determined based on a wireless signal information similarity between the third track point and the target track point, where the uncertainty herein may also be related to confidence information carried in the GPS information, and the confidence information may indicate accuracy of the absolute location in the GPS information).

In an existing method, absolute coordinate mapping is mainly implemented based on an indoor map. Currently, there is no indoor map for many indoor scenarios. Consequently, the existing method is invalid, and cannot be applied and deployed on a large scale. In this embodiment of this application, absolute coordinates of a 3D indoor fingerprint map are determined based on matching between a track point at an entrance/exit and an indoor estimation point, without depending on an indoor map. This is highly universal and has high precision, and meets a capability of large-scale commercial deployment.

In an embodiment, the obtaining a third track point includes: obtaining a plurality of first candidate track points, and confidence and an indoor/outdoor state of each first candidate track point, where each first candidate track point includes wireless signal information; and comparing wireless signal similarities between the plurality of first candidate track points and the plurality of first track points based on the confidence, the indoor/outdoor state, and the included wireless signal information of each first candidate track point, to determine, from the plurality of candidate track points, M first candidate track points whose wireless signal similarities are greater than the threshold, where each of the first candidate track points is in an outdoor state and the confidence is greater than the threshold, the M first candidate track points include the third track point, and M is a positive integer.

The confidence herein may be accuracy (ACC) information carried in the GPS information, or information that is calculated based on the GPS information and that can indicate confidence of positioning of the GPS information.

The indoor/outdoor state herein may be determined based on a GNSS status in the GPS information. For example, the indoor/outdoor state may be determined in the following manner.

(1) An indoor/outdoor state classifier is trained based on the GNSS status information of the identified indoor and outdoor tracks and based on logistic regression.

(2) A track with GNSS status information with prediction is predicted based on a trained classifier.

(3) If the predicted score is greater than a specific threshold, the outdoor state is determined, or if the predicted score is not greater than a specific threshold, the indoor state is determined. In this case, a state sequence of indoor and outdoor identification of the entire track is constructed.

(4) A switching point is identified to switch the indoor and outdoor state based on an indoor and outdoor identification state sequence.

The M herein may be a positive integer greater than or equal to 3, and the determined M first candidate track points are not collinear track points.

In an embodiment, the method further includes: obtaining a plurality of second candidate track points, where each second candidate track point includes wireless signal information and is in an indoor-outdoor switching state; comparing wireless signal similarities between the plurality of second candidate track points and the plurality of first track points included on each horizontal layer, to determine, from the plurality of first track points included on each horizontal layer, a second candidate track point whose wireless signal similarity is greater than the threshold; and determining, based on a quantity of second candidate track points determined on each horizontal layer, an absolute floor of a horizontal layer with a largest quantity of the determined second candidate track points.

There is a great difference between wireless signal information of different second candidate track points in the plurality of second candidate track points. Therefore, it can be ensured that the determined second candidate track point may indicate one entrance/exit, and different second candidate track points may indicate different entrances/exits.

The determined quantity of second candidate track points may represent a quantity of entrances/exits. The absolute floor herein may be an absolute floor 1 (because a largest quantity of indoor and outdoor entrances/exits are set on the ground floor (that is, the floor number is the absolute floor 1) in most buildings, a floor with the largest quantity of entrances/exits may be the absolute floor 1). The absolute floor herein may alternatively be another absolute floor (for example, in some shopping malls, a floor with a largest quantity of entrances/exits is marked as a floor B1, a floor 2, or another floor other than a floor 1).

In an embodiment, the method further includes: determining an upper-floor and lower-floor relationship between the horizontal layers in the layering result based on upward and downward track information indicated by the second track; and determining an absolute floor of each horizontal layer in the layering result based on the absolute floor of the horizontal layer with the largest quantity of the determined second candidate track points and the upper-floor and lower-floor relationship.

The upward and downward track information indicated by the second track herein may be determined based on sensor information (for example, a barometer and acceleration information) included in the plurality of second track points, and the upward and downward track information may indicate an upward-downward relationship between two horizontal layers connected to the second track in physical space.

There may be a plurality of second tracks. In this case, the plurality of second tracks may indicate the upward-downward relationship between the horizontal layers.

In an embodiment, based on a generated 3D relative skeleton topology and an entrance/exit fingerprint library, matching may be first performed between each layer in the 3D skeleton and the entrance/exit fingerprint library, to generate a matching relationship matrix, then sorting is performed based on the matching relationship matrix, a floor that is most matched with the entrance/exit fingerprint library is determined as an absolute floor 1, and then an absolute floor number of each layer is updated based on the floor sorting relationship, so that absolute mapping of the 3D skeleton floor is implemented without depending on an indoor map.

According to a second aspect, this application provides an apparatus for constructing an indoor map, where the apparatus includes:

an obtaining module, configured to obtain a plurality of first tracks and a second track, where each first track is a flat-layer track located on an indoor horizontal layer, the second track is a cross-layer track located between different indoor horizontal layers, each first track includes a plurality of first track points, the second track includes a plurality of second track points, each first track point and each second track point include wireless signal information at locations of the first track point and the second track point respectively, and a first wireless signal information similarity between each first track point and each second track point is less than a first threshold;

a layering module, configured to perform layering on the plurality of first tracks based on a second wireless signal information similarity between the plurality of first track points included in the plurality of first tracks, to obtain a layering result, where the layering result includes a plurality of horizontal layers and a first track included on each horizontal layer, and first tracks whose second wireless signal information similarity is greater than a second threshold are grouped into a same horizontal layer; and a map construction module, configured to construct an indoor map based on the layering result and the second track.

Crowdsourcing data is triggered in a random mode without being perceived by a user. Therefore, originally collected crowdsourcing data is indoor and outdoor data, a flat-layer track, a cross-layer track, and various behavioral states. The difficulty of track layering lies in mixed layers of tracks. In an indoor scenario, such as shopping malls, there are a large number of elevators, escalators, and staircases between floors and a large hollow area. Due to these factors, radio frequency signals such as Wi-Fi signals are transmitted between the floors without obstacles. Therefore, a fingerprint similarity between tracks of adjacent floors in these areas cannot be distinguished, resulting in layer mixing. In this embodiment of this application, because wireless signals of the first track points participating in the layering and the track points of the cross-layer track differ greatly, that is, track points near the cross-layer track are not used for layering, tracks on different planes are not incorrectly identified as tracks on a same layer, thereby improving accuracy of track layering.

In an embodiment, each second track point further includes acceleration information and a time at a location of the second track point, and an acceleration of the second track in a time sequence of the time changes from a first state to a second state and then to a third state.

The first state is an increased state in which a change rate is greater than a threshold, the second state is a steady state in which the change rate is less than the threshold, and the third state is a decreased state in which the change rate is greater than the threshold.

The first state is a decreased state in which a change rate is greater than a threshold, the second state is a steady state in which the change rate is less than the threshold, and the third state is an increased state in which the change rate is greater than the threshold.

When a user crosses floors, for example, by taking an escalator or an elevator, an accelerometer has an obvious change in an upward and downward process. In the upward process, the accelerometer has an obvious process of first increasing, then being steady, and finally decreasing, while the downward process is the opposite. Therefore, a cross-layer track can be effectively identified by detecting a change characteristic of the acceleration.

In an embodiment, the wireless signal information indicates strength of a wireless signal received at a location and an identifier of a network device that sends the wireless signal.

The wireless signal strength may also be referred to as received signal strength (RSS), and specifically refers to a received wideband power on a channel bandwidth received by a terminal, in a unit of dBm. The value is a relative value, and is related to receive antenna quality of the terminal, surrounding environmental link blocking, a distance between the terminal and a signal transmit source, and the like.

In an embodiment, the obtaining module is further configured to:

obtain a plurality of initial tracks, where each initial track includes a plurality of track points, each track point includes wireless signal information received at a location of the track point, and each initial track is a flat-layer track located on the indoor horizontal layer; and determine that a track point, among the plurality of track points included in the plurality of initial tracks, whose wireless signal information similarity to that of each second track point is less than the first threshold is the first track point, to obtain the first track.

Because wireless signals of the first track points participating in the layering and the track points of the cross-layer track differ greatly, that is, track points near the cross-layer track are not used for layering, tracks on different planes are not incorrectly identified as tracks on a same layer, thereby improving accuracy of track layering.

In an embodiment, the obtaining module is further configured to:

obtain a third track point, where the third track point includes wireless signal information and GPS information at a location of the third track point, a wireless signal information similarity between the third track point and a target track point in the plurality of first track points is greater than a third threshold, the GPS information indicates an absolute location of the target track point, and the target track point further includes a relative location in the plurality of first tracks; and determine a location conversion relationship based on the absolute location and the relative location, and determine, based on the location conversion relationship, absolute locations of a plurality of first track points included in each first track.

In an existing method, absolute coordinate mapping is mainly implemented based on an indoor map. Currently, there is no indoor map for many indoor scenarios. Consequently, the existing method is invalid, and cannot be applied and deployed on a large scale. In this embodiment of this application, absolute coordinates of a 3D indoor fingerprint map are determined based on matching between a track point at an entrance/exit and an indoor estimation point, without depending on an indoor map. This is highly universal and has high precision, and meets a capability of large-scale commercial deployment.

In an embodiment, the obtaining module is specifically configured to:

obtain a plurality of first candidate track points, and confidence and an indoor/outdoor state of each first candidate track point, where each first candidate track point includes wireless signal information; and compare wireless signal similarities between the plurality of first candidate track points and the plurality of first track points based on the confidence, the indoor/outdoor state, and the included wireless signal information of each first candidate track point, to determine, from the plurality of candidate track points, M first candidate track points whose wireless signal similarities are greater than the threshold, where each of the first candidate track points is in an outdoor state and the confidence is greater than the threshold, the M first candidate track points include the third track point, and M is a positive integer.

In an embodiment, the obtaining module is specifically configured to:

obtain a plurality of second candidate track points, where each second candidate track point includes wireless signal information and is in an indoor-outdoor switching state;

compare wireless signal similarities between the plurality of second candidate track points and the plurality of first track points included on each horizontal layer, to determine, from the plurality of first track points included on each horizontal layer, a second candidate track point whose wireless signal similarity is greater than the threshold; and determine, based on a quantity of second candidate track points determined on each horizontal layer, an absolute floor of a horizontal layer with a largest quantity of the determined second candidate track points.

In an embodiment, the floor determining module is further configured to:

determine an upper-floor and lower-floor relationship between the horizontal layers in the layering result based on upward and downward track information indicated by the second track; and determine an absolute floor of each horizontal layer in the layering result based on the absolute floor of the horizontal layer with the largest quantity of the determined second candidate track points and the upper-floor and lower-floor relationship.

In an embodiment, based on a generated 3D relative skeleton topology and an entrance/exit fingerprint library, matching may be first performed between each layer in the 3D skeleton and the entrance/exit fingerprint library, to generate a matching relationship matrix, then sorting is performed based on the matching relationship matrix, a floor that is most matched with the entrance/exit fingerprint library is determined as an absolute floor 1, and then an absolute floor number of each layer is updated based on the floor sorting relationship, so that absolute mapping of the 3D skeleton floor is implemented without depending on an indoor map.

According to a third aspect, an embodiment of this application provides a computer-readable storage medium, including computer-readable instructions. When the computer-readable instructions are run on a computer device, the computer device is enabled to perform the first aspect and any one of the optional methods of the first aspect.

According to a fourth aspect, an embodiment of this application provides a computer program product, including computer-readable instructions. When the computer-readable instructions are run on a computer device, the computer device is enabled to perform the first aspect and any one of the optional methods of the first aspect.

According to a fifth aspect, this application provides a chip system. The chip system includes a processor, configured to support a computing device in implementing functions in the foregoing aspects, for example, sending or processing data or information in the foregoing method. In a possible design, the chip system further includes a memory. The memory is configured to store program instructions and data that are necessary for the computing device. The chip system may include a chip, or may include a chip and another discrete component.

According to a sixth aspect, this application provides a server, including one or more processors and a memory. The memory stores computer-readable instructions, and the one or more processors read the computer-readable instructions, so that the computer device performs the first aspect and any one of the optional methods of the first aspect.

In an embodiment, the server further includes a communications interface;

the communications interface is configured to receive a location query instruction of a terminal device;

the one or more processors are further configured to determine a location query result based on the location query instruction and the indoor map; and the communications interface is further configured to send the location query result to the terminal device.

An embodiment of this application provides a method for constructing an indoor map. The method includes: obtaining a plurality of first tracks and a second track, where each first track is a flat-layer track located on an indoor horizontal layer, the second track is a cross-layer track located between different indoor horizontal layers, each first track includes a plurality of first track points, the second track includes a plurality of second track points, each first track point and each second track point include wireless signal information at locations of the first track point and the second track point respectively, and a first wireless signal information similarity between each first track point and each second track point is less than a first threshold; performing layering on the plurality of first tracks based on a second wireless signal information similarity between the plurality of first track points included in the plurality of first tracks, to obtain a layering result, where the layering result includes a plurality of horizontal layers and a first track included on each horizontal layer, and first tracks whose second wireless signal information similarity is greater than a second threshold are grouped into a same horizontal layer; and constructing an indoor map based on the layering result and the second track. Because wireless signals of the first track points participating in the layering and the track points of the cross-layer track differ greatly, that is, track points near the cross-layer track are not used for layering, tracks on different planes are not incorrectly identified as tracks on a same layer, thereby improving accuracy of track layering.

BRIEF DESCRIPTION OF DRAWINGS

FIG. 1 is a schematic diagram of a method for constructing an indoor map according to an embodiment of this application;

DESCRIPTION OF EMBODIMENTS

Figure 2:
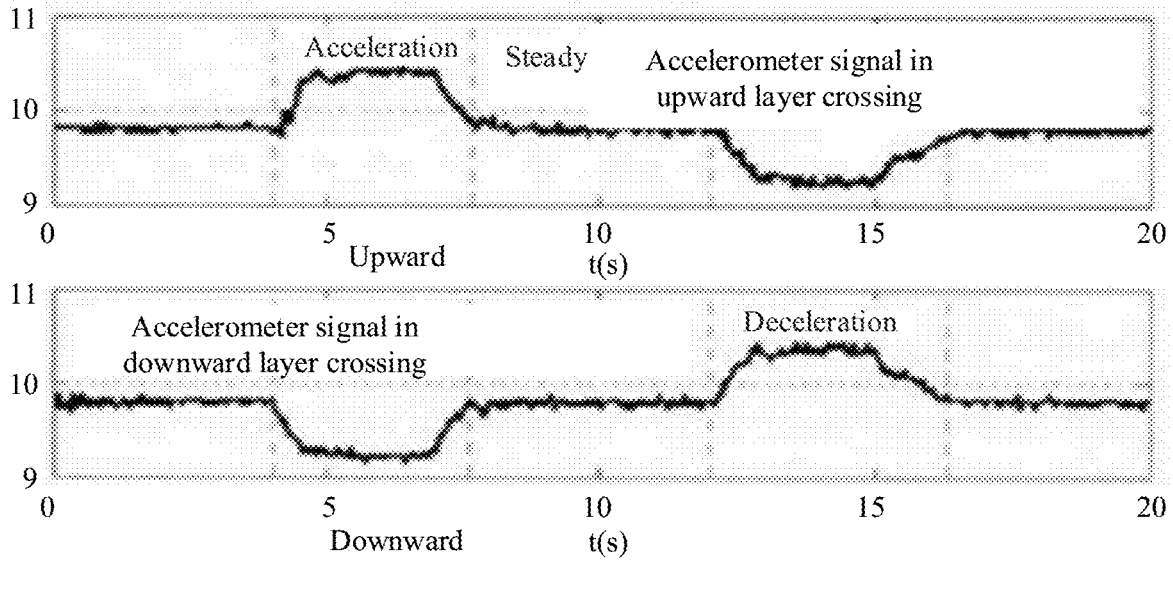
FIG. 2 is a schematic diagram of cross-layer track identification according to an embodiment of this application.

The following describes embodiments of the present invention with reference to accompanying drawings in embodiments of the present invention. Terms used in implementations of the present invention are merely intended to explain specific embodiments of the present invention, and are not intended to limit the present invention.

In this specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The following briefly describes key terms and abbreviations in embodiments of this application, as shown in the following.

Fingerprint: A wireless signal (for example, a terminal base station signal, a Wi-Fi signal for wireless local area network communication), a ubiquitous geomagnetic signal, or a small-range signal transmitted with a deployed Bluetooth signal label is measured, a unique identifier name (for example, a medium access control (MAC) address) of the signals, signal strength, and mapped longitude and latitude coordinates of the signals are recorded, and the recorded information is stored in a database as a reference for subsequent real-time positioning and matching. Each of the stored positioning points and corresponding recorded information may be referred to as a "fingerprint". During real-time positioning, a real-time location is obtained and a positioning function is implemented through successful fingerprint matching.

Location feature: A constant location in an indoor structure body, including an entrance/exit, a door, an elevator, a stair, an escalator, a corridor, an open area, and a corner.

Motion feature: A typical motion feature of a user, which may include motion features such as being still, walking, running, turning, and going upstairs/downstairs.

Map matching: A method for matching a location feature and an actual moving track that are identified with a connection relationship between a location point provided in a map and different areas in the map, and correcting an actual moving route and a positioning point to an accurate path and a location point.

Received signal strength (RSS): The received signal strength specifically refers to a received wideband power on a channel bandwidth received by a terminal, in a unit of dBm. The value is a relative value, and is related to receive antenna quality of the terminal, surrounding environmental link blocking, a distance between the terminal and a signal transmit source, and the like.

Dynamic time warping (DTW): Based on dynamic planning, a template matching problem of different pronunciation lengths is solved. The dynamic time warping is a classic algorithm that appears earlier in speech recognition, and no extra calculation is required in the training of the algorithm. In a geomagnetic matching application, the algorithm is used to solve a problem of signal upsizing or compression caused by different user walking speeds in real-time positioning, to ensure correct matching with original data.

Pedestrian dead reckoning (PDR): A method for estimating a distance and direction of a pedestrian based on characteristics of human walking dynamics, including step detection, stride estimation, and heading estimation. A sensor, such as an accelerometer, a magnetometer, or a gyroscope, provided by the terminal is used for estimation.

K-Nearest Neighbors (KNN): Each sample can be represented by k neighbors that are the closest to the sample. If most of the k neighbors of a sample in feature space fall into a specific category, the sample is included in the category and has the features of the sample in the category.

Weighted K-Nearest Neighbors (WKNN): Weight factors are added to describe the impact of file differences on a result, to increase an effect on the category. The algorithm is implemented as the way of the KNN algorithm.

Support vector machine (SVM): The support vector machine is a supervised learning model used for pattern recognition, classification, and regression analysis in machine learning.

Point of interest (POI): In a geographic information system, a POI can be a house, a store, a mail box, or a bus station. Each POI includes four types of information: a name, a type, a longitude, and a latitude.

Indoor positioning can be used in a scenario for consumers, including shopping mall guide, reverse car search, anti-family separation, self-service tour guide in a museum exhibition hall, location guide in a hospital, a scenic spot, or an airport, location query and navigation of a surrounding location, and location sharing; and a scenario for enterprise customers, including crowd flow monitoring, user behavior analysis, smart warehousing, operation optimization analysis, advertisement push, and emergency rescue.

An existing indoor positioning method mainly has two modes. In one mode, an actively deployed signal label is used. For example, the signal label may include a radio frequency identification system, a Bluetooth label, an infrared emission label, and the like. A terminal receives signals sent by using the signal labels, and associates the signals with locations corresponding to the signal labels, to calculate a location of the terminal. However, the application of the signal label is limited by high deployment costs and high operation and maintenance costs of periodic maintenance and replacement due to an impact of a service life of a battery. In the other mode, a common wireless signal is used. For example, the wireless signal may include a base station signal used for terminal communication and a wireless fidelity (Wi-Fi) signal used for wireless local area network communication. The received signal strength (RSS) is used as a "fingerprint" of each location, and a fingerprint list and corresponding location information of the locations are collected, classified, and stored in a large range in advance, to form a fingerprint database. During subsequent positioning, a fingerprint of an unknown location is used to match with the fingerprint database, and location information corresponding to the most matched fingerprint is output as a positioning result. This mode is widely used because Wi-Fi hotspots are ubiquitous and no hardware cost is required.

Indoor positioning requires initial investment, regardless of whether it is implemented based on active deployment of signal labels or existing signal labels, or based on offline fingerprint collection and online fingerprint matching. Currently, various application solutions are exploring how to update or maintain an existing signal label or fingerprint database to ensure accuracy of reference information, thereby ensuring precision of real-time positioning.

Crowdsourcing data is triggered in a random mode without being perceived by a user. Therefore, originally collected crowdsourcing data is indoor and outdoor data, a flat-layer track, a cross-layer track, and various behavioral states. The difficulty of track layering lies in mixed layers of tracks. In an indoor scenario, such as shopping malls, there are a large number of elevators, escalators, and staircases between floors and a large hollow area. Due to these factors, radio frequency signals such as Wi-Fi signals are transmitted between the floors without obstacles. Therefore, a fingerprint similarity between tracks of adjacent floors in these areas cannot be distinguished, resulting in layer mixing.

In addition, existing construction of an indoor map needs to depend on an indoor planar map, and absolute coordinate information of a track is obtained by performing matching based on a behavioral sequence model and an indoor map point-line model. When there is no indoor map with absolute coordinates in an indoor environment, the absolute coordinate mapping cannot be completed by using the method.

In view of this, an embodiment of this application provides a method for constructing an indoor map.

FIG. 1 is a schematic flowchart of a method for constructing an indoor map according to an embodiment of this application. As shown in FIG. 1, the method for constructing an indoor map provided in this embodiment of this application includes the following operations.

Operation 101: Obtain a plurality of first tracks and a second track, where each first track is a flat-layer track located on an indoor horizontal layer, the second track is a cross-layer track located between different indoor horizontal layers, each first track point and each second track point include wireless signal information at locations of the first track point and the second track point respectively, and a first wireless signal information similarity between each first track point and each second track point is less than a first threshold.

In this embodiment of this application, a server may obtain crowdsourcing data reported by a collection device on a terminal side. It may be understood that the collection device herein may be a mobile phone, a tablet computer, a laptop computer, a digital camera, a personal digital assistant (PDA), a navigation apparatus, a mobile internet device (MID), a wearable device, or the like. This is not specifically limited.

The collection device on the terminal side may anonymously collect available data (which may also be referred to as fingerprint data) such as a sensor signal, a network signal, and a global navigation satellite system (GNSS) signal of user equipment by using a specific trigger mechanism without being perceived by a user. Optionally, the sensor signal may include data of an IMU sensor (for example, an accelerometer, a gyroscope, or a magnetometer) and positioning sensor data (GNSS positioning information, or a GNSS status), and wireless signal data may include data of Wi-Fi, Bluetooth, a base station, and the like.

In an embodiment, the collection device may have a real-time upload capability, that is, the collection device may upload collected data to the server in real time. Alternatively, after completing data collection, the collection device uploads the collected data to the server together. The collected data is used by the server to construct an indoor map.

In this embodiment of this application, the server may obtain a plurality of indoor tracks based on the crowdsourcing data reported by the terminal, where each track point in the indoor track may include wireless signal information and sensor information at a location of the track point, and whether a track is a flat-layer track or a cross-layer track may be identified by using the sensor information of the track point.

It should be understood that the flat-layer track herein may be understood as a track on a horizontal plane, for example, a track on an indoor horizontal floor; and the cross-layer track may be understood as a track between indoor planes, for example, a track on an escalator or an elevator.

The wireless signal information herein may refer to a signal that can be received in an indoor area, and does not include GPS information. For example, the wireless signal information may include but is not limited to Wi-Fi, Bluetooth, a signal from a base station cell, fine time measurement (FTM), ultra-wideband (UWB), a geomagnetic field, and the like.

In an embodiment, the sensor information may be acceleration information, so that the server can identify a high-confidence cross-layer track (the second track) by using the acceleration information included in the track point.

Specifically, it may be determined that a track whose acceleration information meets the following condition is the second track: an acceleration of each track point in the track in a time sequence of the time changes from a first state to a second state and then to a third state, where the first state is an increased state in which a change rate is greater than a threshold, the second state is a steady state in which the change rate is less than the threshold, and the third state is a decreased state in which the change rate is greater than the threshold; or the first state is a decreased state in which a change rate is greater than a threshold, the second state is a steady state in which the change rate is less than the threshold, and the third state is an increased state in which the change rate is greater than the threshold.

The time sequence herein may be a forward time sequence or a reverse time sequence along the time included in each second track point. For example, the plurality of track points include a track point 1, a track point 2, a track point 3, a track point 4, a track point 5, a track point 6, a track point 7, a track point 8, a track point 9, and a track point 10. A time at which the sensor information is collected in the track point 1 is 0.005, a time at which the sensor information is collected in the track point 2 is 0.010, a time at which the sensor information is collected in the track point 3 is 0.015, a time at which the sensor information is collected in the track point 4 is 0.02, a time at which the sensor information is collected in the track point 5 is 0.025, a time at which the sensor information is collected in the track point 6 is 0.03, a time at which the sensor information is collected in the track point 7 is 0.035, a time at which the sensor information is collected in the track point 8 is 0.04, a time at which the sensor information is collected in the track point 9 is 0.045, and a time at which the sensor information is collected in the track point 10 is 0.05. In this case, the acceleration of each second track point in the second track in the time sequence of the time may be an acceleration in a sequence of the track point 1, the track point 2, the track point 3, the track point 4, the track point 5, the track point 6, the track point 7, the track point 8, the track point 9, and the track point 10; or an acceleration in a sequence of the track point 10, the track point 9, the track point 8, the track point 7, the track point 6, the track point 5, the track point 4, the track point 3, the track point 2, and the track point 1.

When a user crosses floors, for example, by taking an escalator or an elevator, an accelerometer has an obvious change in an upward and downward process. In the upward process, the accelerometer has an obvious process of first increasing, then being steady, and finally decreasing, while the downward process is the opposite. Therefore, a cross-layer track can be effectively identified by detecting a change characteristic of the acceleration.

Each second track point in the first track determined in the foregoing manner includes the acceleration information collected at a location of the second track point, and along a direction of the second track, accelerations of the plurality of second track points change from a first state to a second state and then to a third state. The first state is an increased state in which a change rate is greater than a threshold, the second state is a steady state in which the change rate is less than the threshold, and the third state is a decreased state in which the change rate is greater than the threshold; or the first state is a decreased state in which a change rate is greater than a threshold, the second state is a steady state in which the change rate is less than the threshold, and the third state is an increased state in which the change rate is greater than the threshold.

For example, track points on both sides of an escalator are not blocked. Therefore, a case in which track points on a flat-layer track at two ends of a cross-layer track are located on different plane layers and wireless signal information is very similar may occur. If layering of the flat-layer track is performed based on these track points, tracks on different planes may be incorrectly identified as tracks on a same layer. Therefore, in this embodiment of this application, based on the cross-layer track, flat-layer track points that meet the foregoing condition (that are located on different plane layers with similar wireless signals) may be removed, and then layering is performed on the removed track points.

Specifically, a plurality of initial tracks may be obtained, where each initial track includes a plurality of track points, and each track point includes wireless signal information received at a location of the track point; a track point whose wireless signal information similarity between each second track point and the plurality of track points included in the plurality of initial tracks is less than the first threshold is determined as the first track point; and track layering is performed based on the first track point. Because wireless signals of the first track points participating in the layering and the track points of the cross-layer track differ greatly, that is, track points near the cross-layer track are not used for layering, tracks on different planes are not incorrectly identified as tracks on a same layer, thereby improving accuracy of track layering.

In addition, to obtain a high-confidence flat-layer track, the flat-layer track detection is performed based on horizontal and vertical speed models. Because a speed on an elevator or an escalator is estimated to zero by using a current PDR algorithm, when there is no continuous low-speed range (that is, a static range) in the track and a vertical speed is zero, the track is in a flat-layer running mode, and the high-confidence flat-layer track is identified by using the speed mode.

Figure 3:
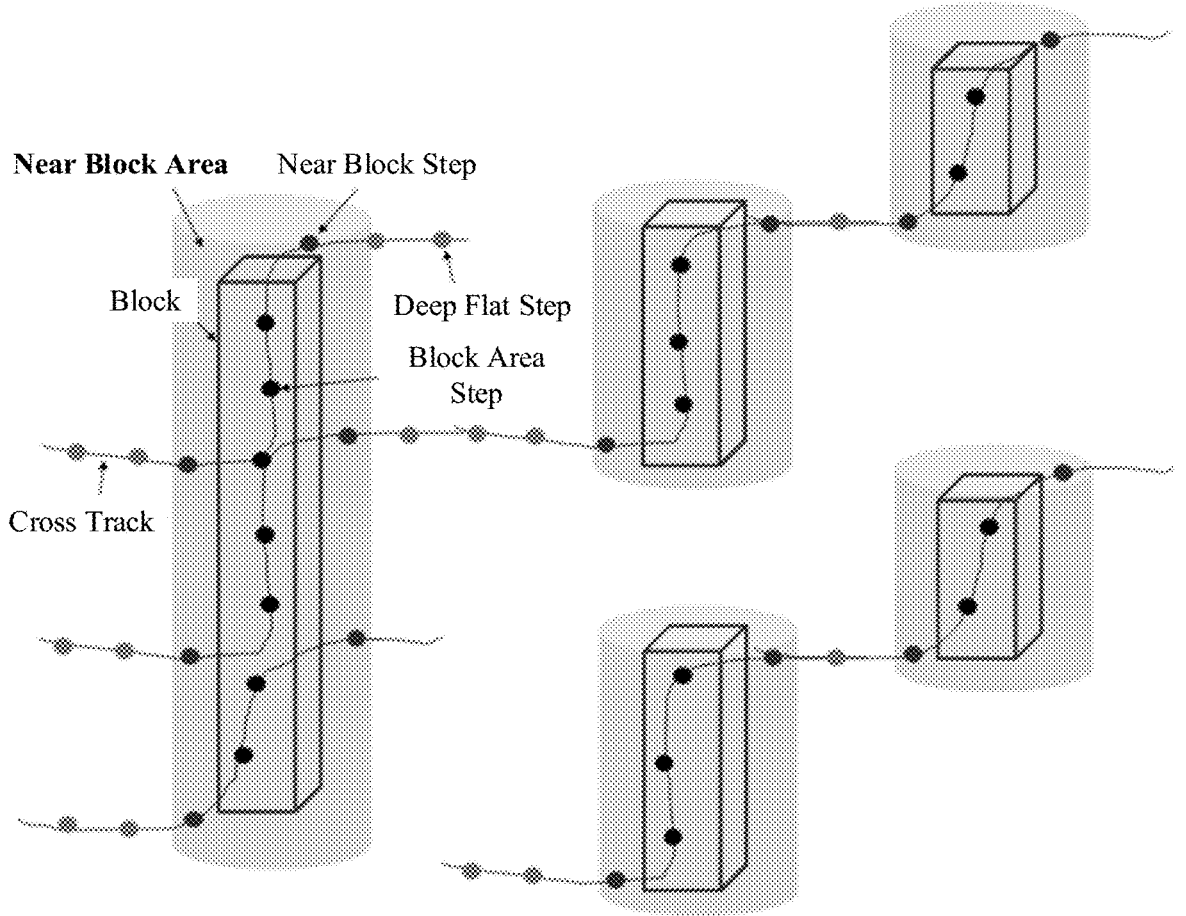
FIG. 3 is a schematic diagram of tracks according to an embodiment of this application.

Specifically, the second track may also be referred to as a crossing area fingerprint, and a track point whose wireless signal information similarity between each second track point and the plurality of track points included in the plurality of initial tracks is less than the first threshold is a near area fingerprint, which together forms a fingerprint block band. Due to a transmission feature of a radio frequency signal such as Wi-Fi, an excessively high similarity exists between fingerprints in a crossing area between layers and a hollow area in an indoor scenario. Therefore, the fingerprint block band can effectively identify fingerprints near the area in the track. In this way, the fingerprint matching between isolated floor crossing areas, such as elevators, escalators, stairs, and hollow areas can effectively solve the problem of mixed track layers. FIG. 3 is a schematic diagram of a fingerprint block band.

In FIG. 3, each curve represents a complete cross-layer track, where a light gray point represents a fingerprint step point on a flat layer segment, a dark black point represents a fingerprint step point in a crossing area and is also information used to generate a block band, and a light black point represents a fingerprint step point in a near block area and may be identified by fingerprint matching between the fingerprint point in the track and the fingerprint block band.

Operation 102: Perform layering on the plurality of first tracks based on a wireless signal information similarity between the first track points included in the plurality of first tracks, to obtain a layering result, where the layering result includes a plurality of horizontal layers and a first track included on each horizontal layer, and first tracks whose wireless signal information similarity is greater than a second threshold are grouped into a same horizontal layer.

The first track point and the second track point may include the wireless signal information at the locations of the first track point and the second track point respectively. The wireless signal information may indicate strength of a wireless signal received at the location of the track point and a network device that sends the wireless signal. When the wireless signal information included in the track point on the flat-layer track is similar to the wireless signal information included in the second track point, it may be considered that a physical location of the track point on the flat-layer track is close to or overlaps a physical location of the second track point. In this embodiment of this application, a track point that is on the flat-layer track and whose wireless signal information is similar to the wireless signal information included in the second track point needs to be removed (or marked, where the mark may indicate that the wireless signal information is similar and the track point does not participate in subsequent layering of the flat-layer track), and all first track points participating in the subsequent layering meet that a first wireless signal information similarity between each first track point and each second track point is less than the first threshold.

The first wireless signal information similarity between the first track point and the second track point may be related to a coincidence degree of network device identifiers included in the first track point and the second track point. When only a small quantity (or proportion) of network device identifiers are overlapped (for example, the identifiers do not overlap at all, or only one, two, or three identifiers overlap, or only less than 10, 20, or 30 percent of identifiers overlap) in the network device identifiers included in the first track point and the second track point, it may be considered that the first wireless signal information similarity between the first track point and the second track point is less than the first threshold.

The first wireless signal information similarity between the first track point and the second track point may further be related to a signal strength similarity of wireless signals included in the first track point and the second track point. When the first track point and the second track point include a same network device identifier, the first wireless signal information similarity between the first track point and the second track point may further be related (for example, may be positively correlated) to a wireless signal strength similarity of network devices corresponding to the same network device identifier.

For example, the first wireless signal information similarity between the first track point and the second track point may be quantized based on a similarity value, and the value is related (for example, positively correlated) to a coincidence degree of the network device identifiers included in the first track point and the second track point, and is further related (for example, positively correlated) to wireless signal strength of the network devices corresponding to the same network device identifier included in the first track point and the second track point. When the similarity value is less than the first threshold, it may be considered that the first wireless signal information similarity between the first track point and the second track point is less than the first threshold.

The first threshold may be set based on experience, provided that the first threshold can represent that the wireless signal information of the first track point and the second track point is very similar, so that precision of subsequent layering of the flat-layer track can be affected. A value of the first threshold is not limited in this application.

In this embodiment of this application, distributed hierarchical track clustering may be performed on the plurality of first tracks based on the wireless signal information similarity between the first track points included in the plurality of first tracks. The distributed hierarchical track clustering plays a key role in track layering. First, full matching is performed based on a fingerprint block band and all flat-layer tracks to identify fingerprints of the flat-layer tracks in a near block area, and then pairwise matching is performed on all identified flat-layer tracks, to generate a full track matching matrix, where fingerprints that are identified as fingerprints in the near block area are not used for matching (for isolation). Finally, based on the matching matrix, the distributed hierarchical clustering of the flat-layer track is completed through branch growth and branch merging of seed tracks, to generate a flat-layer track set. The specific implementation is described below.

Figure 4:
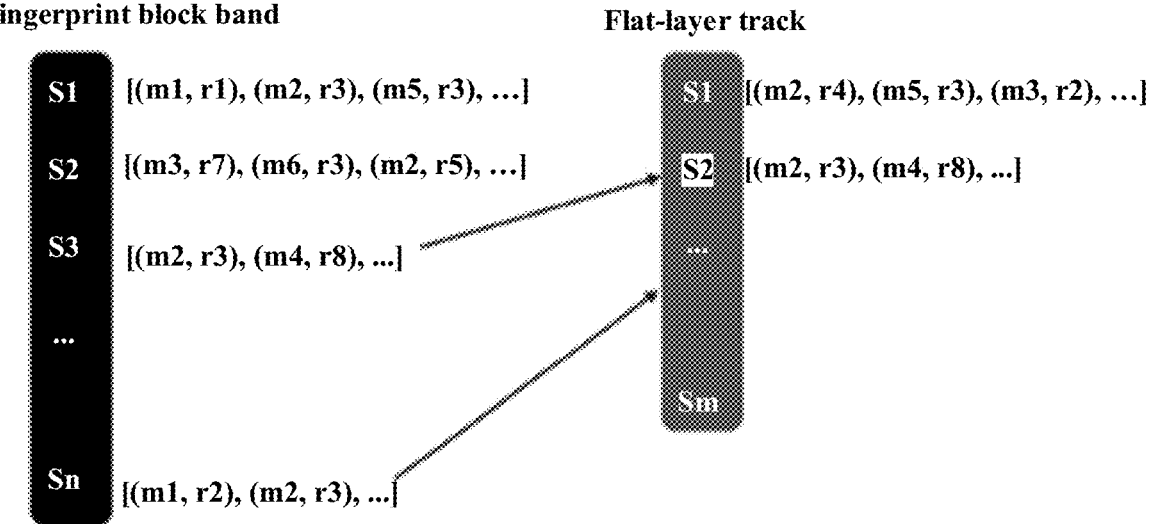
FIG. 4 and FIG. 5 are schematic diagrams of track point matching according to an embodiment of this application.
Figure 5:
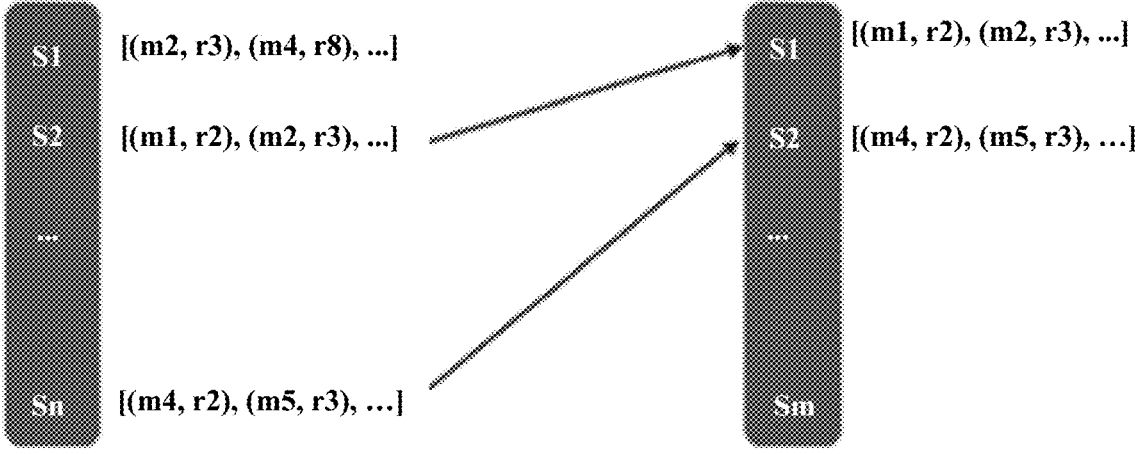

In an embodiment, full track matching may first be performed, where the full track matching includes two stages as shown in FIG. 4 and FIG. 5. FIG. 4 shows matching between a fingerprint block band and a flat-layer track, and FIG. 5 shows matching between flat-layer tracks. A key process of the matching is to calculate a similarity FBetaScore between the fingerprint points.

For example, the fingerprint block band includes n fingerprint points, defined as Block={$S_1$, $S_2$ . . . , $S_n$}. Each fingerprint point includes p scanned APs and signal strength RSSIs of the p APs, defined as $$S^i_{block} = \{(m_1, r_1), (m_2, r_2), \ldots (m_p, r_p)\}(i = 1, 2, \ldots p).$$

Because the flat-layer track includes relative location coordinates and fingerprint information, a track including m fingerprint step points is defined as $Track_{flat}$={$S_1$, $S_2$ . . . $S_m$}. Each fingerprint step point includes location coordinate information of the point, q scanned Aps, and signal strength information of the q APs, defined as $$S^j_{Track} =$$

$$\{(x_1, y_1, m_1, r_1), (x_2, y_2, m_2, r_2), \ldots (x_q, y_q, m_q, r_q)\}(j = 1, 2, \ldots q).$$

The similarity FBetaScore between the fingerprint points is calculated as follows:

$$F \text{ Beta Score}\left(S^i_{Block}, S^j_{Track}\right) = \left(1 + \beta^2\right) \cdot \frac{JacSim \cdot RssiSim}{\beta^2 \cdot JacSim + RssiSim},$$

where $\beta$ is a weight factor. If $\beta$ is greater than 1, it indicates that RssiSim is weighted higher; or if $\beta$ is less than 1, it indicates that JacSim is weighted higher. JacSim represents similarity measurement between MACs scanned by using fingerprints, and is represented by a ratio of an intersection set to a union set of MACs, and a calculation formula is as follows:

$$JacSim\left(S^i_{Block}, S^j_{Track}\right) = \frac{p \cap q}{p \cup q},$$

where

RssiSim represents similarity measurement of AP signal strength scanned by using fingerprints, and a calculation formula is as follows:

$$RssiSim\left(S^i_{Block}, S^j_{Track}\right) = \exp\left(-(d - 4.8)/8.0\right), \text{ and}$$

$$d = \frac{\sum_i^{p \cap q} \left|r^i_{Block} - r^j_{Track}\right| \cdot w_i}{\sum_i^{p \cap q} w_i},$$

where d represents a distance between fingerprint signal strength of two fingerprint points, and $w_i$ represents a weight of a common $i^{th}$ AP in the calculation.

In an embodiment, when matching is performed between the fingerprint block band and the flat-layer track, when $$FBetaScore\left(S^i_{Block}, S^j_{Track}\right)$$

is greater than a specified threshold, $$S^j_{Track}$$

in this case may be identified as a fingerprint in a near block area, and is not used for matching in a subsequent full matching process of the flat-layer track, to achieve an isolation effect.

Then, the matching between the flat-layer tracks may be performed. When fingerprints of two tracks are matched, if $$BetaScore\left(S^i_{Track1}, S^j_{Track2}\right)$$

is greater than the specified threshold, index numbers of current fingerprints in the two tracks are recorded. After all the fingerprints in the two tracks are matched, a matching index relationship between the two tracks may be obtained. Table 1 shows a global matching index matrix of all flat-layer tracks.

TABLE 1

| | T1 | T2 | Tk |
|---|---|---|---|
| T1 | / | Set {S1, S3, . . .} | . . . Set {S1, S3, . . .} |
| T2 | Set {S2, S7, . . .} | / | . . . Set {S1, Sk-1, . . .} |
| . . . | | . . . | / . . . |
| Tj | Set {S2, S3, . . .} | Set {S5, Sj-2, . . .} | . . . / |

Figure 6:
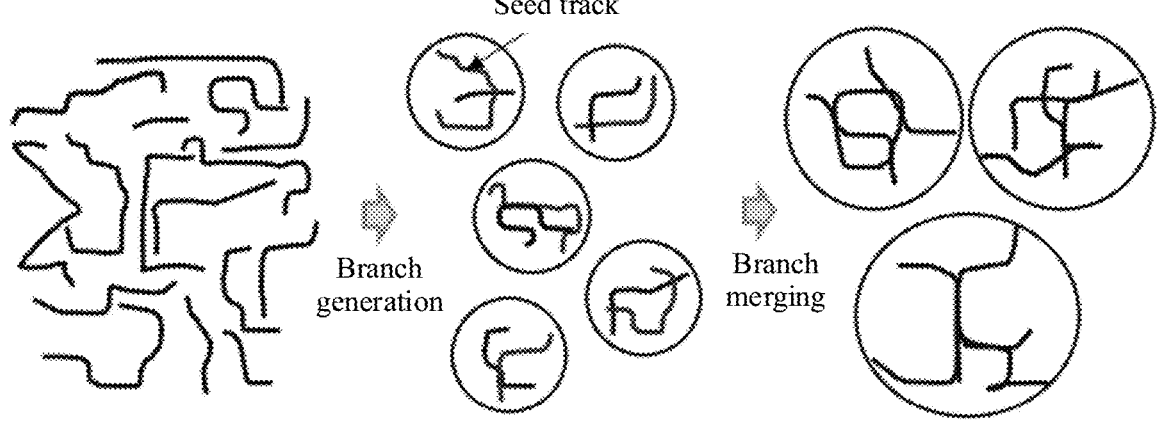
FIG. 6 is a schematic diagram of branch generation and branch merging according to an embodiment of this application.

In an embodiment, branch growth and branch merging may be performed. A process of branch growth and merging clustering of tracks may be shown in FIG. 6. A left part of FIG. 6 shows a schematic process of branch growth. In the branch growth, clustering of local regional tracks by using a regional connectivity feature of local tracks may be implemented. First, seed tracks are sorted out from all flat-layer tracks based on an internal distance length of the tracks, and an initial seed branch set $$TrunkSet = \left\{Trunk_{seed}^1, Trunk_{seed}^2, \ldots, Trunk_{seed}^i\right\}$$

is generated by using the seed tracks, then according to the matching matrix of all tracks, the track growth and merging are performed through the distributed and paralleled initial seed branches, and finally a local track branch set with regional connectivity is generated. A fingerprint match rate MatchRate is calculated between the tracks and the seed branch, where MatchRate is calculated as follows:

$$\text{Match Rate}\left(Trunk_{seed}^i, Trunk_{Flat}^j\right) = \frac{F\left(Trunk_{seed}^i, Track_{Flat}^j\right)}{C\left(Track_{Flat}^j\right)},$$

where $$F\left(Trunk_{seed}^i, Trunk_{Flat}^j\right)$$

represents a quantity of fingerprints that match a track and all tracks in a branch, and $$C\left(Track_{Flat}^j\right)$$

represents a quantity of all fingerprints included in the track. When MatchRate is greater than a specific threshold, the track and the seed branch are merged.

A right part of FIG. 6 shows a process of branch merging. In the branch merging, connected branches on floors are merged based on a matching relationship between tracks in the branches and fingerprints. First, all local branches are sorted according to a quantity of tracks in branches, and then a fingerprint match rate $$MatchRate\left(Trunk_{seed}^i, Trunk_{seed}^j\right)$$

between the branches is calculated in sequence, which is similar to a merging process of tracks and branches. Finally, a track set of each floor is generated to complete layering processing.

In an embodiment, an unsupervised 3D skeleton topology may be constructed by sampling. A core problem is to reconstruct a 3D indoor skeleton structure based on a radio frequency signal and sensor information, including generation of a 2D skeleton and a 3D skeleton topology, which is mainly completed by performing steps such as 2D graph-based optimization for multi-source information fusion, cross-layer matching, 3D skeleton consistency alignment, and 3D topology sorting. The 2D graph-based optimization for multi-source information fusion refers to the fusion of the multi-source information such as wireless signals and sensors, and a graph model is used as the core to efficiently construct a 2D skeleton for layered crowdsourcing tracks by using pose graph optimization.

Figure 7:
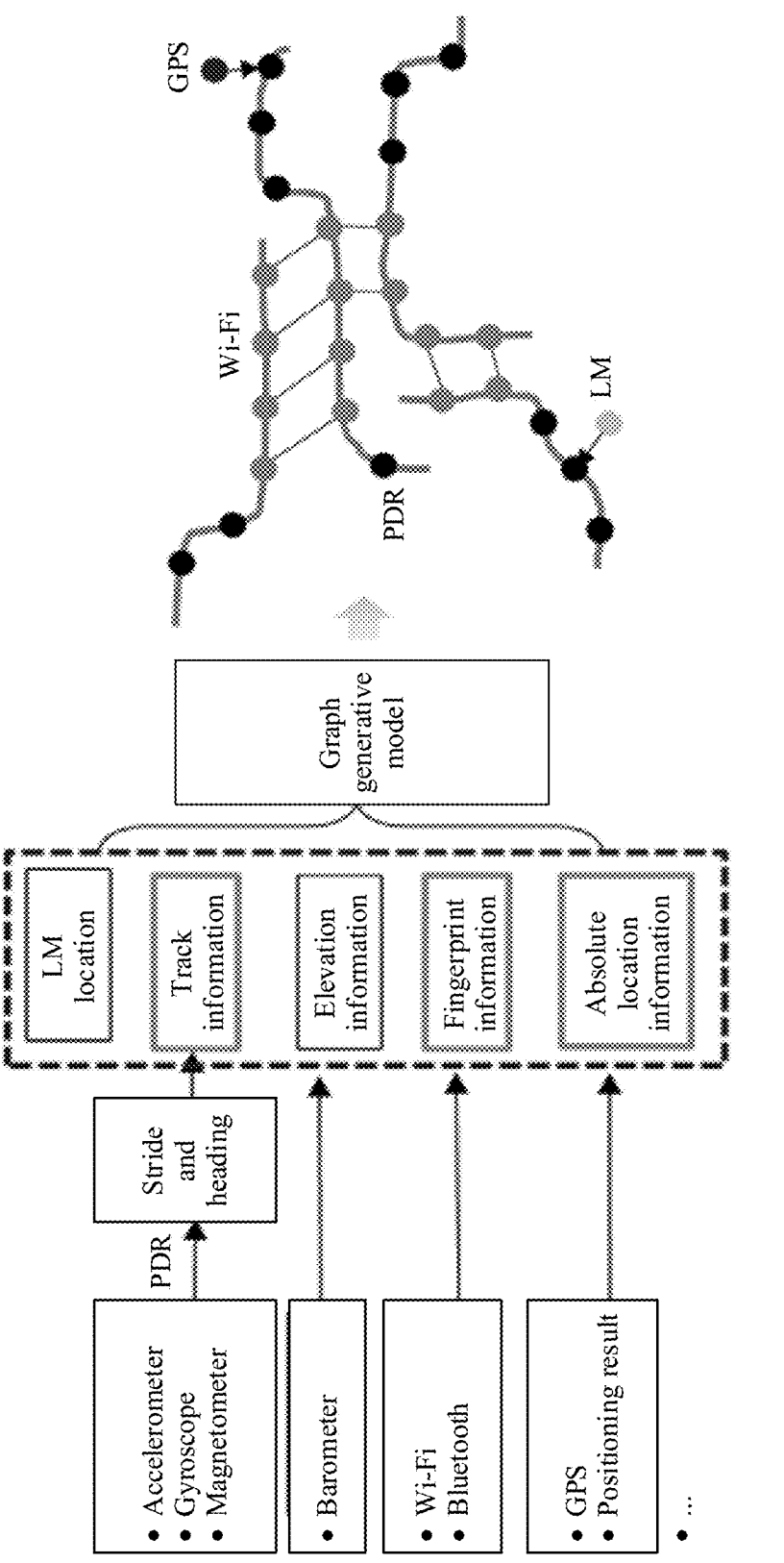
FIG. 7 to FIG. 10 are schematic diagrams of a method for constructing an indoor map according to an embodiment of this application.

In an embodiment, a schematic diagram of generating a multi-source information fusion graph may be shown in FIG. 7. A graph structure is constructed by modeling observation information of a wireless signal and a sensor. The PDR algorithm estimates a stride and heading based on the observation information of sensors, such as an accelerometer, a gyroscope, and a magnetometer. The stride and heading constitute a local constraint relationship between step points in the track. When different users pass a same approximate area in the space, fingerprints scanned at the location are similar. The similarity between the fingerprints is mapped to a physical distance and a distance variance through modeling from the fingerprint wireless signal space to the physical space. In this way, a physical distance constraint relationship between tracks based on fingerprint observation is constructed.

In an embodiment, in a graph generation process, a graph structure is constructed by using observation information to constrain variables that need to be optimized. The variables that need to be optimized, for example, a location of each step point in a track, are used as a vertex, and the observation information, for example, a stride and heading estimated by using the PDR algorithm, and physical distance information mapped based on a Wi-Fi similarity, is used as an edge. Then, global solution is performed in a non-linear optimization manner, and finally a 2D skeleton is generated based on a track optimization result.

Figure 8:
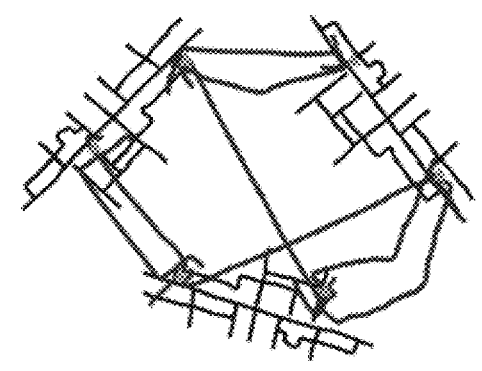

In an embodiment, on a basis of the 2D skeleton, the most critical to further construct a 3D skeleton topology is to use cross-layer tracks. A schematic diagram of cross-layer matching is shown in FIG. 8, including 2D skeletons and cross-layer tracks between the 2D skeletons, where a connection represents a matching relationship. Cross-layer matching means fingerprint similarity matching with a 2D skeleton by using cross-layer tracks in a flat-layer segment, and finally a 2D skeleton pair is formed as a key value by using a connection between the 2D skeletons through cross-layer association. The matching matrix may be shown in Table 2 as an example.

TABLE 2

| | G1 | G2 | G3 |
|---|---|---|---|
| G1 | / | List {T1, T3, . . .} | List {T4, T8, . . .} |
| G2 | List {T2, T7, . . .} | / | List {T5, T6, . . .} |
| G3 | List {T10, T11, . . .} | List {T7, T9, . . .} | / |

Figure 9:
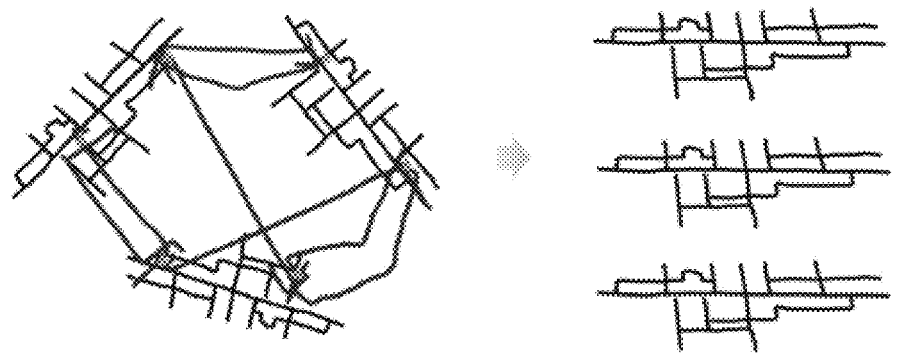

Because the 2D skeleton is generated independently, coordinate systems between the skeletons are independent. A schematic diagram of 3D skeleton consistency alignment is shown in FIG. 9. Through the 3D skeleton consistency alignment, based on a global cross-layer matching result, omnidirectional transfer of coordinates between skeletons is implemented by using a connection point pair relationship between the 2D skeletons, so as to complete alignment of coordinates between the skeletons.

A specific implementation process is as follows: First, a skeleton with a maximum connection degree is selected as an initial reference floor skeleton based on a global cross-layer matching matrix and a connection degree of cross-layer tracks, and is also used as an initial consistent skeleton set. Based on the consistent skeleton set, a next to-be-consistent skeleton is selected based on a cross-layer matching relationship and a connection degree of the cross-layer tracks, and a conversion relationship between skeletons is calculated by using a full connection point pair between the consistent skeleton set and the current to-be-consistent skeleton by using a random sampling consensus (RANSAC) algorithm and graph-based optimization solution, so as to implement consistent transfer and alignment of coordinates of the current to-be-consistent skeleton. After the current skeleton is consistent, the current skeleton is added to the consistent skeleton set. The above process is iteratively performed until all 2D skeletons have been aligned consistently.

Figure 10:
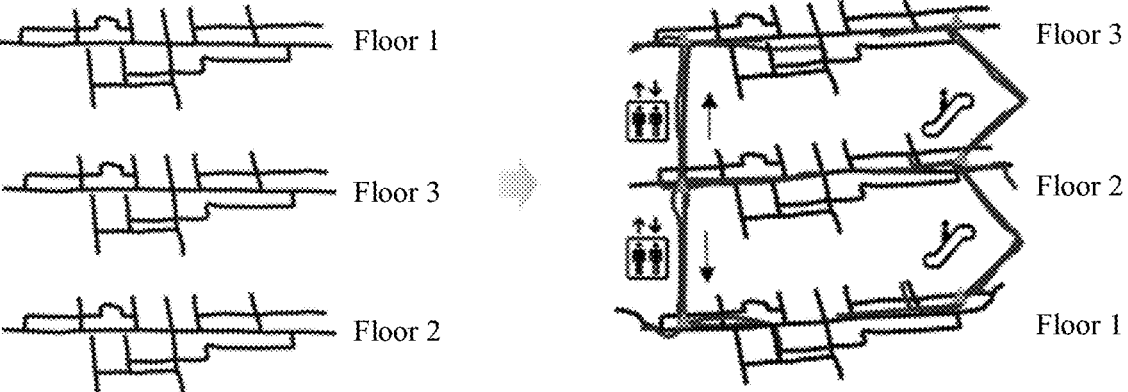

In an embodiment, 3D skeleton consistency implements alignment of coordinates between the skeletons, and an up-down topology relationship between floor skeletons is another important problem of a 3D structure. A schematic diagram of 3D skeleton topology sorting is shown in FIG. 10. In the 3D skeleton topology sorting, based on a global cross-layer matching result, a directed acyclic graph between the skeletons is constructed by using an upward-downward relationship of cross-layer tracks, and topology sorting of 3D skeleton floors is implemented by using topology sorting.

In this embodiment of this application, based on full track matching, a problem of track layering with a high complexity is quickly resolved in a manner of merging and growth of a plurality of seed tracks. In addition, in an existing method, a fingerprint map is constructed mainly by using track behavioral model matching or a method based on received signal strength (RSS) sequence-based multi-point clustering, and only a local feature is considered for extension. Therefore, efficiency is low and precision is poor. In this patent, multi-source information fusion modeling is performed on observation information of a wireless signal and a sensor, and a graph structure is used to perform non-linear optimization for a global solution to a 2D skeleton. In addition, based on high-confidence cross-layer tracks, consistency alignment and topology sorting of a 3D skeleton are implemented by matching the track and the skeleton, and a 3D indoor structure is effectively reconstructed.

In the foregoing manner, a 3D fingerprint skeleton may be generated based on the layering result. Because an originally generated crowdsourcing track is used in a relative coordinate system, the 3D fingerprint skeleton constructed by using the flat-layer tracks and cross-layer tracks is also in a relative coordinate system, and the relative coordinates cannot be directly used for absolute location positioning. Therefore, the 3D relative fingerprint skeleton needs to be absolute.

In an embodiment, a third track point may be obtained. The third track point includes wireless signal information and GPS information (or referred to as GNSS data information) at a location of the third track point, a wireless signal information similarity between the third track point and a target track point in the plurality of first track points is greater than a third threshold, the GPS information indicates an absolute location of the target track point, and the target track point further includes a relative location in the plurality of first tracks. A location conversion relationship is determined based on the absolute location and the relative location, and absolute locations of the plurality of first track points are determined based on the location conversion relationship.

The wireless signal information similarity between the third track point and the second track point may be related to a coincidence degree of network device identifiers included in the third track point and the first track point. When only a small quantity (or proportion) of network device identifiers are overlapped (for example, the identifiers do not overlap at all, or only one, two, or three identifiers overlap, or only less than 10, 20, or 30 percent of identifiers overlap) in the network device identifiers included in the third track point and the first track point, it may be considered that the wireless signal information similarity between the third track point and the first track point is less than the third threshold.

The wireless signal information similarity between the third track point and the first track point may further be related to a signal strength similarity of wireless signals included in the third track point and the first track point. When the third track point and the first track point include a same network device identifier, the wireless signal information similarity between the third track point and the first track point may further be related (for example, may be positively correlated) to a wireless signal strength similarity of network devices corresponding to the same network device identifier.

For example, the wireless signal information similarity between the third track point and the first track point may be quantized based on a similarity value, and the value is related (for example, positively correlated) to a coincidence degree of the network device identifiers included in the third track point and the first track point, and is further related (for example, positively correlated) to wireless signal strength of the network devices corresponding to the same network device identifier included in the third track point and the first track point. When the similarity value is greater than the third threshold, it may be considered that the wireless signal information similarity between the third track point and the first track point is greater than the third threshold.

The third threshold may be set based on experience. It may be basically considered that the third track point and the first track point completely overlap or basically overlap, provided that the third threshold can represent that the wireless signal information of the third track point and the first track point is very similar. A value of the third threshold is not limited in this application.

The GPS information herein indicates an absolute location of the target track point, and may be understood as that the GPS information may indicate an absolute location of the third track point. Because the wireless signal information of the third track point and the target track point is very similar, it may be considered that a physical location of the third track point and a physical location of the target track point completely overlap or basically overlap. In this case, the GPS information may be used as the absolute location of the target track point.

The GPS information may include absolute location information (for example, geographical coordinates), and may further include uncertainty of the absolute location information (because the third track point may not strictly overlap the first track point, the uncertainty of the GPS information may be determined based on a wireless signal information similarity between the third track point and the target track point, where the uncertainty herein may also be related to confidence information carried in the GPS information, and the confidence information may indicate accuracy of the absolute location in the GPS information).

In an existing method, absolute coordinate mapping is mainly implemented based on an indoor map. Currently, there is no indoor map for many indoor scenarios. Consequently, the existing method is invalid, and cannot be applied and deployed on a large scale. In this embodiment of this application, absolute coordinates of a 3D indoor fingerprint map are determined based on matching between a track point at an entrance/exit and an indoor estimation point, without depending on an indoor map. This is highly universal and has high precision, and meets a capability of large-scale commercial deployment.

Figure 11A:
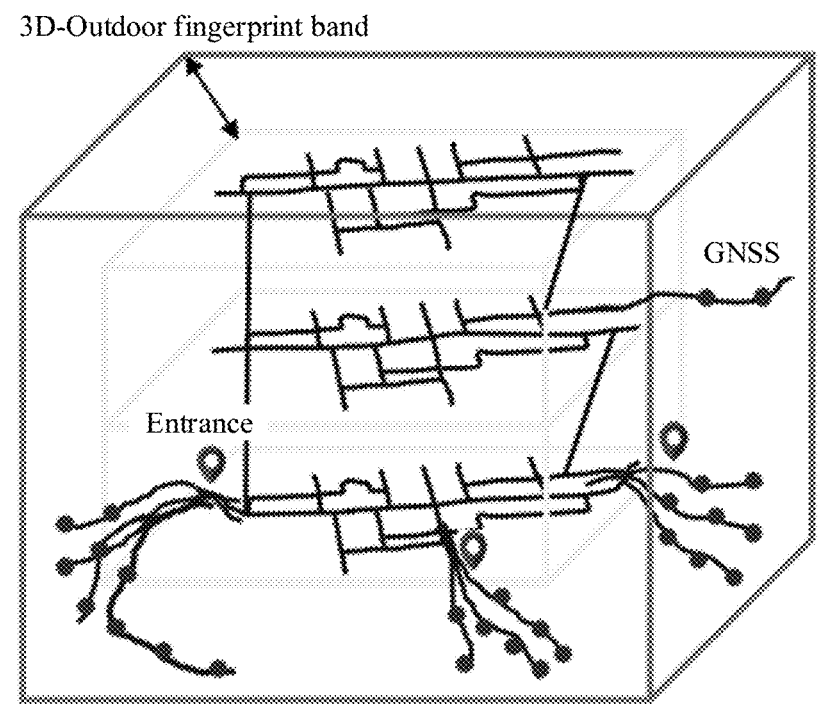
FIG. 11a and FIG. 11b are schematic diagrams of a method for constructing an indoor map according to an embodiment of this application.

In this embodiment of this application, distribution of crowdsourcing tracks is integrated in indoor and outdoor scenarios. Therefore, GNSS data information can be received for an outdoor track of a neighboring building, an indoor-outdoor traversal track, and a track of an open-air area on each floor. This is unique absolute location information carried in the crowdsourcing data. High-precision absolute location information mining is based on the track with GNSS in the crowdsourcing track. Feature analysis, extraction, and indoor/outdoor state switching detection are performed on satellite status information such as GNSS and a GNSS-Status collected from the track, to generate a 3D outdoor fingerprint band and an entrance/exit fingerprint library. FIG. 11a is a schematic diagram of high-precision absolute information mining, where black dots represent high-precision location fingerprints identified from crowdsourcing tracks, and form a 3D outdoor fingerprint band. The entrance/exit identifier represents an entrance/exit fingerprint library generated by clustering switching points based on indoor/outdoor state switching detection.

In an embodiment, a plurality of first candidate track points, and confidence and an indoor/outdoor state of each first candidate track point may be obtained, where each first candidate track point includes wireless signal information; and wireless signal similarities between the plurality of first candidate track points and the plurality of first track points are compared based on the confidence, the indoor/outdoor state, and the included wireless signal information of each first candidate track point, to determine, from the plurality of candidate track points, M first candidate track points whose wireless signal similarities are greater than the threshold, where each of the first candidate track points is in an outdoor state and the confidence is greater than the threshold, the M first candidate track points include the third track point, and M is a positive integer.

The confidence herein may be accuracy (ACC) information carried in the GPS information, or information that is calculated based on the GPS information and that can indicate confidence of positioning of the GPS information.

The indoor/outdoor state herein may be determined based on a GNSS status in the GPS information. For example, the indoor/outdoor state may be determined in the following manner.

(1) An indoor/outdoor state classifier is trained based on the GNSS status information of the identified indoor and outdoor tracks and based on logistic regression.

(2) A track with GNSS status information with prediction is predicted based on a trained classifier.

(3) If the predicted score is greater than a specific threshold, the outdoor state is determined, or if the predicted score is not greater than a specific threshold, the indoor state is determined. In this case, a state sequence of indoor and outdoor identification of the entire track is constructed.

(4) A switching point is identified to switch the indoor and outdoor state based on an indoor and outdoor identification state sequence.

The M herein may be a positive integer greater than or equal to 3, and the determined M first candidate track points are not collinear track points.

Figure 11B:
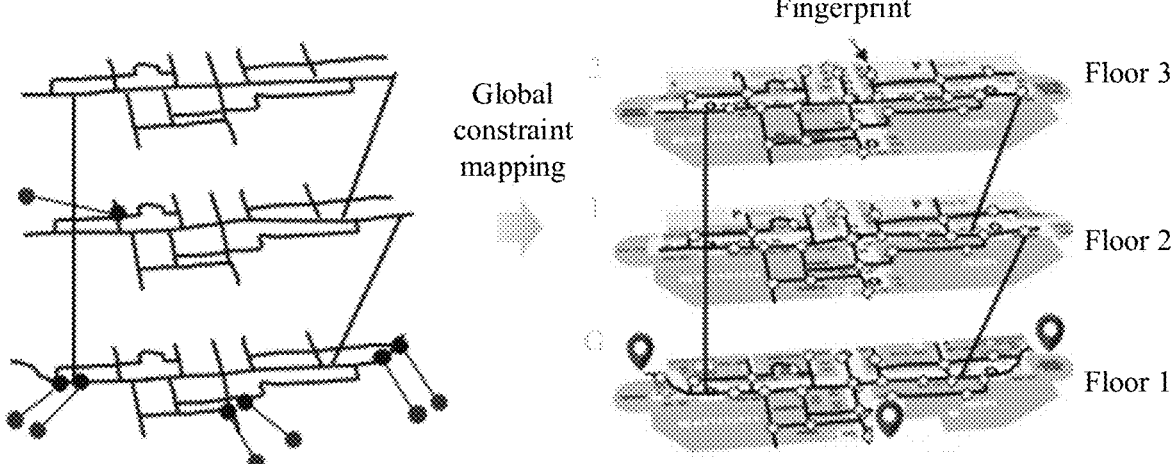

For example, absolute mapping of the 3D skeleton includes absolute coordinate absolutization of the 3D skeleton and floor absolutization of the 3D skeleton. FIG. 11b shows a schematic diagram of a 3D skeleton absolutization mapping of a global constraint. Based on the generated 3D relative skeleton topology and a 3D outdoor fingerprint band, global fingerprint matching may be first performed to generate a matching point pair set. A point outside the 3D fingerprint skeleton in a left part of the FIG. 11b may represent a point matching with the 3D fingerprint band, a point on the 3D fingerprint skeleton may represent a point matching with the 3D relative skeleton, and a connection line between the points represents a matching point pair relationship. Then, an optimal transformation matrix parameter T (or referred to as a location conversion relationship) is calculated by using RANSAC based on the global matching constraint, and mapping from a 3D relative skeleton to an absolute geographic coordinate system is completed according to the transformation matrix T. The transformation matrix T may be shown as follows:

$$T = \begin{bmatrix} s \cdot \cos\theta & s \cdot \sin\theta & t_x \\ -s \cdot \sin\theta & s \cdot \cos\theta & t_y \end{bmatrix}.$$

In an embodiment, a plurality of second candidate track points may be obtained, where each second candidate track point includes wireless signal information and is in an indoor-outdoor switching state; wireless signal similarities between the plurality of second candidate track points and the plurality of first track points included on each horizontal layer are compared, to determine, from the plurality of first track points included on each horizontal layer, a second candidate track point whose wireless signal similarity is greater than the threshold; and an absolute floor of a horizontal layer with a largest quantity of the determined second candidate track points is determined based on a quantity of second candidate track points determined on each horizontal layer.

There is a great difference between wireless signal information of different second candidate track points in the plurality of second candidate track points. Therefore, it can be ensured that the determined second candidate track point may indicate one entrance/exit, and different second candidate track points may indicate different entrances/exits.

The determined quantity of second candidate track points may represent a quantity of entrances/exits. The absolute floor herein may be an absolute floor 1 (because a largest quantity of indoor and outdoor entrances/exits are set on the ground floor (that is, the floor number is the absolute floor 1) in most buildings, a floor with the largest quantity of entrances/exits may be the absolute floor 1). The absolute floor herein may alternatively be another absolute floor (for example, in some shopping malls, a floor with a largest quantity of entrances/exits is marked as a floor B1, a floor 2, or another floor other than a floor 1).

In an embodiment, the method further includes: determining an upper-floor and lower-floor relationship between the horizontal layers in the layering result based on upward and downward track information indicated by the second track; and determining an absolute floor of each horizontal layer in the layering result based on the absolute floor of the horizontal layer with the largest quantity of the determined second candidate track points and the upper-floor and lower-floor relationship.

The upward and downward track information indicated by the second track herein may be determined based on sensor information (for example, a barometer and acceleration information) included in the plurality of second track points, and the upward and downward track information may indicate an upward-downward relationship between two horizontal layers connected to the second track in physical space.

There may be a plurality of second tracks. In this case, the plurality of second tracks may indicate an upward-downward relationship between the horizontal layers.

In an embodiment, based on a generated 3D relative skeleton topology and an entrance/exit fingerprint library, matching may be first performed between each layer in the 3D skeleton and the entrance/exit fingerprint library, to generate a matching relationship matrix, then sorting is performed based on the matching relationship matrix, a floor that is most matched with the entrance/exit fingerprint library is determined as an absolute floor 1, and then an absolute floor number of each layer is updated based on the floor sorting relationship, so that absolute mapping of the 3D skeleton floor is implemented without depending on an indoor map.

Operation 103: Construct an indoor map based on the layering result and the second track.

Figure 12:
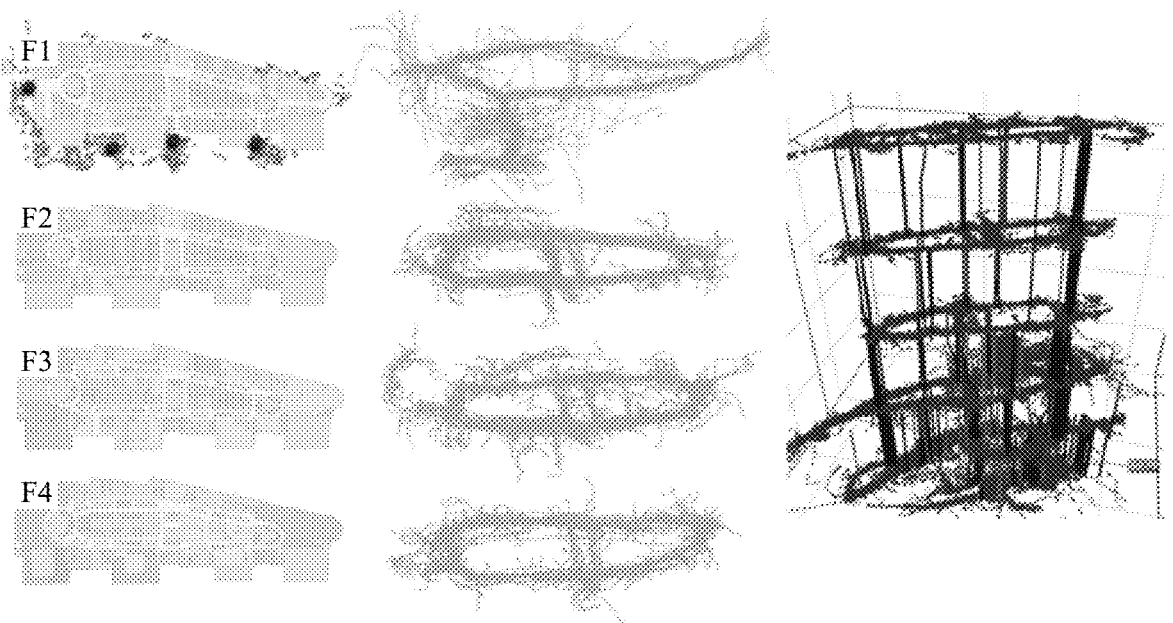
FIG. 12 is a schematic diagram of an indoor map according to an embodiment of this application.

In the foregoing manner, the indoor map may be obtained. For example, FIG. 12 shows a topology result of an indoor fingerprint 2D skeleton and a 3D skeleton that are constructed in floors F1 to F4 in a shopping mall according to an embodiment of this application. A left part of FIG. 12 shows an indoor planar map of the floors F1 to F4; a middle part of FIG. 12 shows a 2D skeleton result of each floor generated based on crowdsourcing data in an embodiment of this application; and a right part of FIG. 12 shows a 3D skeleton topology result generated in this embodiment of this application. Based on the result, it can be learned that the result generated in this embodiment of this application is much close to a real indoor path result.

An embodiment of this application provides a method for constructing an indoor map. The method includes: obtaining a plurality of first tracks and a second track, where each first track is a flat-layer track located on an indoor horizontal layer, the second track is a cross-layer track located between different indoor horizontal layers, each first track includes a plurality of first track points, the second track includes a plurality of second track points, each first track point and each second track point include wireless signal information at locations of the first track point and the second track point respectively, and a first wireless signal information similarity between each first track point and each second track point is less than a first threshold; performing layering on the plurality of first tracks based on a second wireless signal information similarity between the plurality of first track points included in the plurality of first tracks, to obtain a layering result, where the layering result includes a plurality of horizontal layers and a first track included on each horizontal layer, and first tracks whose second wireless signal information similarity is greater than a second threshold are grouped into a same horizontal layer; and constructing an indoor map based on the layering result and the second track. Because wireless signals of the first track points participating in the layering and the track points of the cross-layer track differ greatly, that is, track points near the cross-layer track are not used for layering, tracks on different planes are not incorrectly identified as tracks on a same layer, thereby improving accuracy of track layering.

Figure 13A:
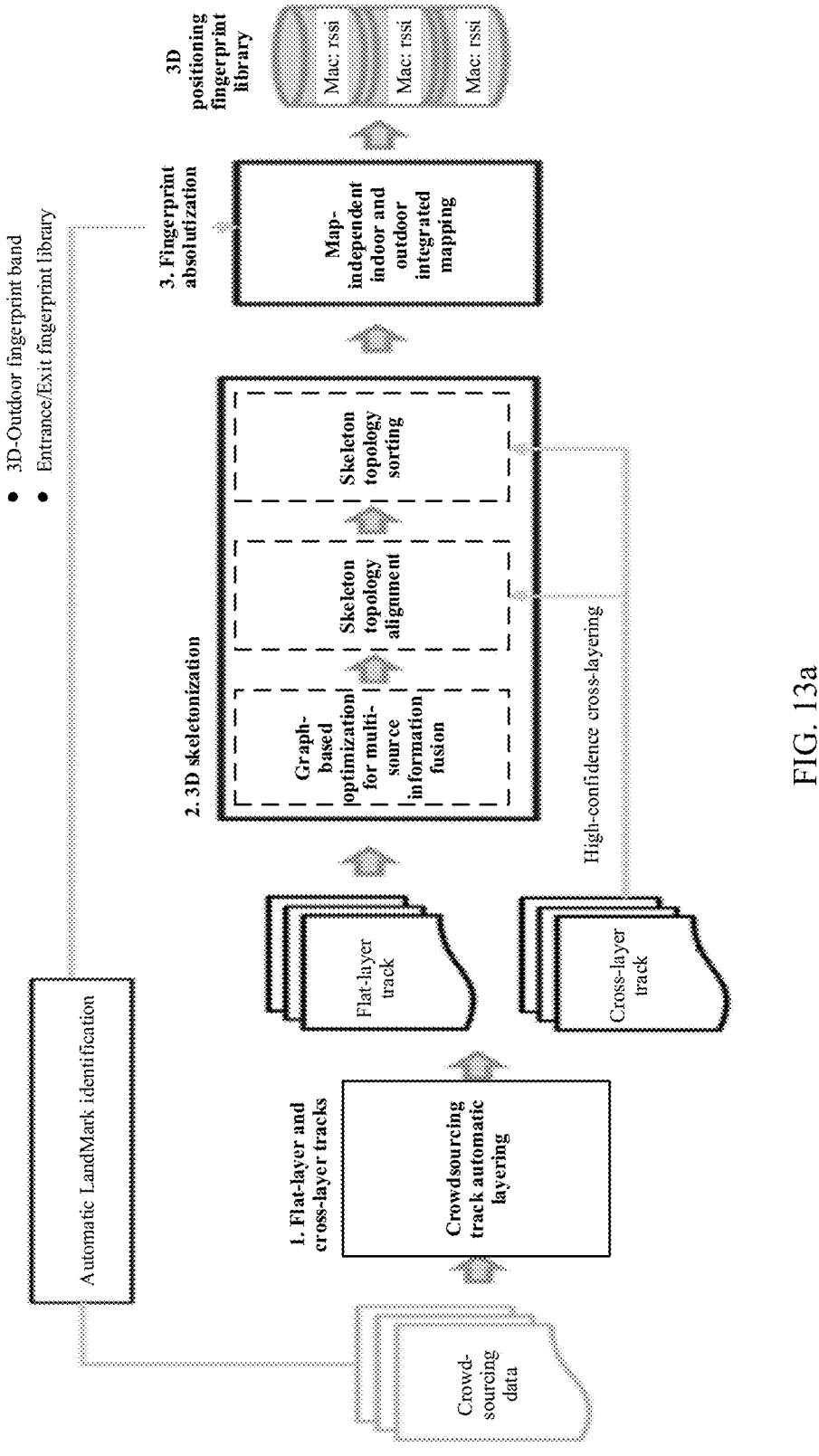
FIG. 13a to FIG. 13d are schematic diagrams of a method for constructing an indoor map according to an embodiment of this application.

FIG. 13a is a flowchart of a method for constructing an indoor map according to an embodiment of this application, including three modules: a crowdsourcing track automatic layering module, an unsupervised 3D skeleton topology construction module, and a map-independent indoor and outdoor integrated mapping module.

The crowdsourcing track automatic layering module is configured to: perform high-confidence cross-layer identification by merging information about wireless signals and information about sensors for complex crowdsourcing data, generate a fingerprint block band, and perform distributed hierarchical track clustering, to output a high-quality set of flat-layer tracks.

Figure 13B:
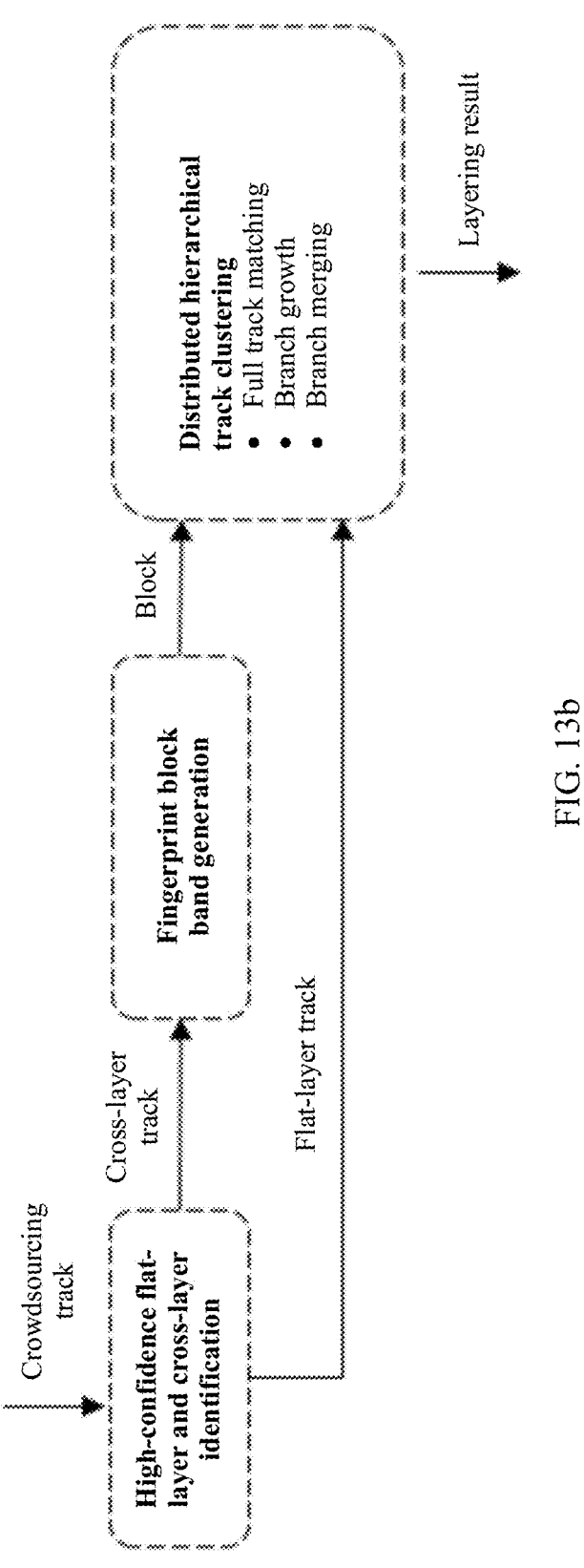

FIG. 13b shows a processing procedure of crowdsourcing track automatic layering. An input of the module is original crowdsourcing signal source data, including PDR tracks, barometer data, gyroscope data, acceleration data, and the like, and an output of the module is a high-quality set of flat-layer tracks. Specific processing steps may include high-confidence flat-layer and cross-layer identification, fingerprint block band generation, and distributed hierarchical track clustering. Indoor crowdsourcing tracks may be classified into flat-layer tracks and cross-layer tracks depending on whether there is a cross-layer event. The high-confidence flat-layer and cross-layer identification is mainly performed by using sensor feature pattern information. The high-confidence flat-layer and cross-layer identification is mainly performed by detecting accelerometer change patterns and horizontal and vertical speed models to identify flat-layer tracks and cross-layer tracks. The fingerprint block band is a key to solving the problem of mixed layers in track layering. Based on the identified high-confidence cross-layer tracks, fingerprints of cross-layer tracks in a crossing area and fingerprints in a near area are combined to generate the fingerprint block band. The fingerprint block band can effectively isolate neighboring layers matching of fingerprints between floor crossing areas, such as elevators, escalators, stairs, and hollow areas, to solve the mixed layer problem. The distributed hierarchical track clustering is implemented based on the flat-layer tracks and the fingerprint block band obtained in the previous two steps. The track layering is completed through full track matching and distributed branch growth and merging. In the full track matching, matching is first performed between the fingerprint block band and all flat-layer tracks, to identify a fingerprint that is in the flat-layer track and that is close to the block band. Then, full matching is performed between every two of all flat-layer tracks to generate a global matching relationship matrix, where a fingerprint identified by the block band is not used for matching. In the distributed branch growth and merging, seed tracks are first sorted out based on an internal distance of the tracks, distributed growth and extension in a near area is performed based on the global matching relationship matrix to generate local branches, and branches are merged based on a proportion of tracks in local branches and fingerprints, to finally complete hierarchical clustering of tracks.

Figure 13C:
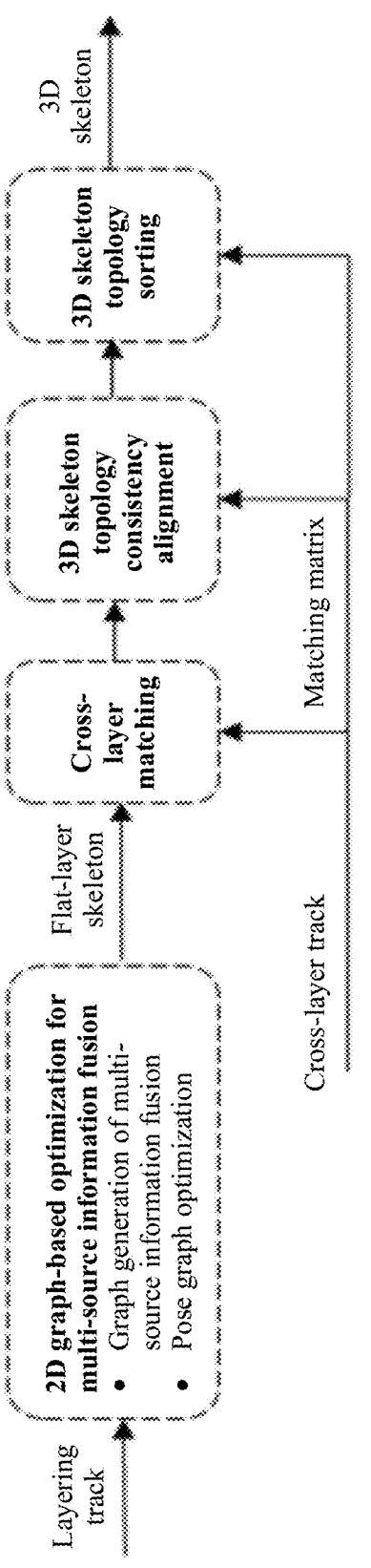

The unsupervised 3D skeleton topology construction module constructs a high-quality 3D skeleton topology by combining wireless signal information and sensor information and through graph-based optimization for multi-source information fusion and a 3D topology alignment and sorting technology. FIG. 13c shows a method flowchart of constructing an unsupervised 3D skeleton topology. An input of the module is a 2D flat-layer track set and a high-confidence cross-layer track. The processing process of the module includes steps such as 2D graph-based optimization for multi-source information fusion, cross-layer matching, skeleton alignment, and 3D topology sorting. An output of the module is a complete relative 3D skeleton topology. Specifically, a process of constructing a 3D skeleton topology may include 2D graph-based optimization for multi-source information fusion. The graph-based optimization for multi-source information fusion is a key technology for constructing a 2D skeleton, and mainly includes graph generation of multi-source information fusion and pose graph optimization solution. The graph generation of multi-source information fusion is to model the observation information of wireless signal and a sensor, and construct a constraint relationship between location points in the PDR track and a constraint relationship between wireless signal Wi-Fi fingerprints between tracks. The pose graph optimization solution is based on the graph structure and a 2D skeleton is constructed through non-linear optimization solution.

The 3D skeleton topology construction may further include cross-layer matching. A key of the cross-layer matching for reconstructing the 3D indoor skeleton structure is an association between a cross-layer track and a 2D skeleton. The cross-layer matching is a global matching relationship constructed between the cross-layer track and the 2D skeleton. Specifically, for each cross-layer track, a fingerprint matching similarity is calculated between cross-layer tracks in two flat-layer segments and 2D skeletons, and a 2D flat-layer skeleton to which each flat-layer segment is best matched is determined, so as to construct a global matching association relationship between the 2D skeleton and the cross-layer track. The global matching relationship is a basis for skeleton consistency alignment and 3D skeleton topology sorting.

The 3D skeleton topology construction may further include 3D skeleton consistency alignment. The 3D skeleton consistency alignment is used based on a cross-layer matching relationship. The 3D skeleton consistency alignment module calculates conversion between skeletons based on a location relationship of cross-layer connection points between the skeletons, and implements alignment between skeleton coordinate systems in an omnidirectional layer-by-layer transfer manner. A specific procedure is as follows: First, a reference floor skeleton is selected based on a cross-layer track connection degree, then a candidate to-be-consistent skeleton list is generated by using a cross-layer matching matrix, and finally, coordinates are transferred on an inconsistent skeleton by using a consistent skeleton in an iterative manner, to implement consistency alignment of all skeletons.

The 3D skeleton topology construction may further include 3D skeleton topology sorting. The 3D skeleton topology sorting is used based on a cross-layer matching relationship and a skeleton alignment result. The 3D skeleton topology sorting is used to construct a directed acyclic graph by using a skeleton as a node based on an upward-downward relationship of cross-layer tracks, and implement a topology sorting relationship of 3D skeleton floors by using topology sorting.

The 3D skeleton constructed by the map-independent 3D skeleton indoor and outdoor integrated mapping module by using flat-layer tracks and cross-layer tracks is in a relative coordinate system, and cannot be directly used for absolute location positioning. Therefore, absolute mapping of the 3D relative fingerprint skeleton is the last key step for generating an indoor positioning fingerprint library.

Figure 13D:
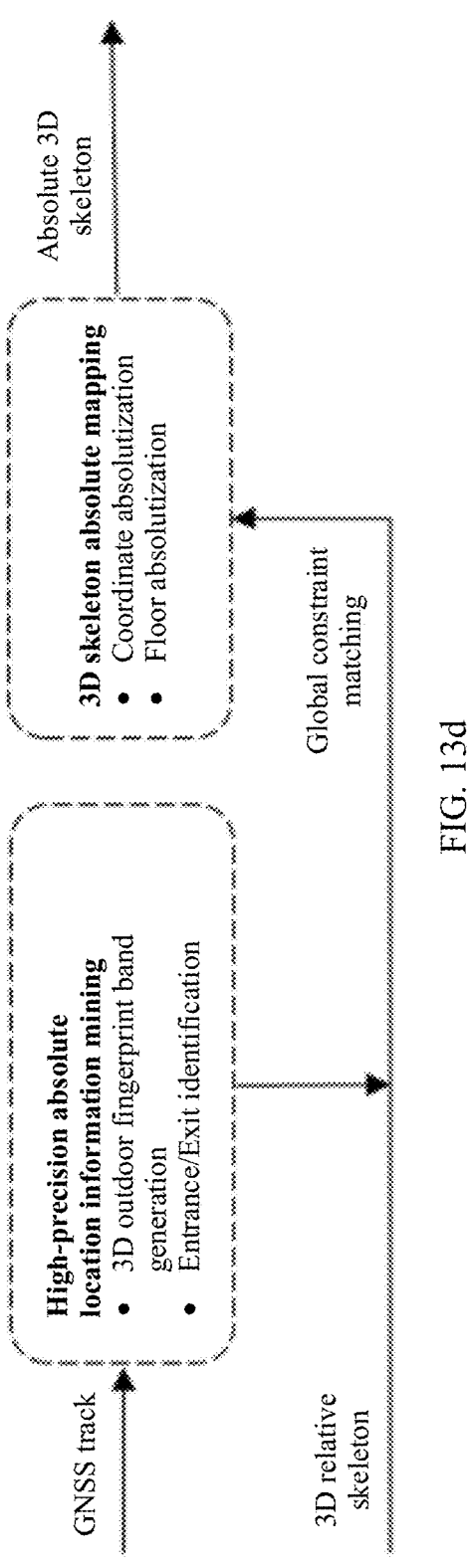

FIG. 13d shows an overall method procedure of map-independent 3D skeleton indoor and outdoor integrated mapping. An input of the module is generated 3D relative fingerprint skeletons and crowdsourcing tracks with GNSS. A processing process of the module includes high-precision absolute location information mining and global constraint 3D skeleton absolute mapping. An output of the module is a 3D indoor fingerprint library with absolute location coordinates and absolute floors.

The map-independent 3D skeleton indoor and outdoor integrated mapping module may include high-precision absolute location information mining. Based on indoor and outdoor crowdsourcing tracks, GNSS and GNSS-Status feature information in the track is analyzed and extracted to identify a high-precision location and fingerprint information of the location, to construct a 3D outdoor fingerprint band and an entrance/exit fingerprint library. In this way, the 3D outdoor fingerprint band and the entrance/exit fingerprint library can be obtained. Global fingerprint matching is performed based on the 3D relative skeleton and the 3D outdoor fingerprint band to construct a global matching point pair. An optimal transformation parameter from a relative coordinate system to an absolute geographic coordinate system is calculated by using RANSAC, to implement absolute coordinate mapping of the 3D skeleton without depending on an indoor map. Then, matching is performed based on the 3D relative skeleton and the entrance/exit fingerprint library, and an absolute floor is determined based on a quantity of matched floors and entrances/exits, to implement absolute floor mapping of the 3D skeleton.

Figure 14:
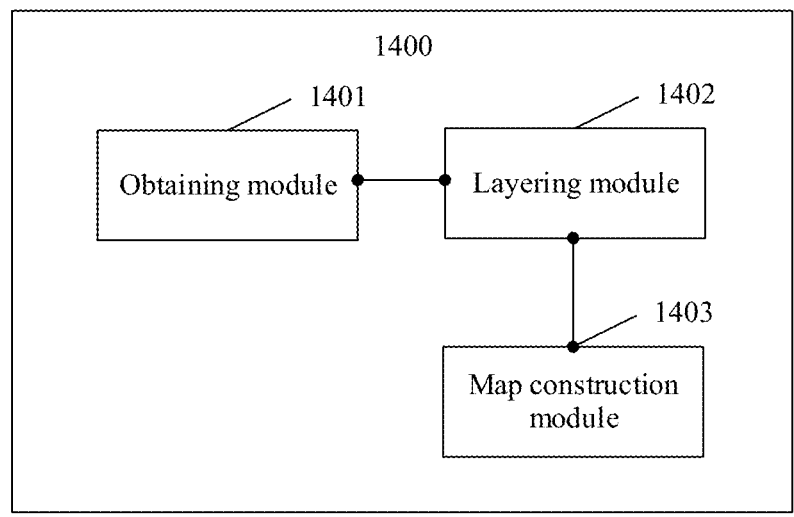
FIG. 14 is a schematic diagram of an apparatus for constructing an indoor map according to an embodiment of this application.

FIG. 14 is a schematic diagram of an apparatus for constructing an indoor map according to an embodiment of this application. The apparatus 1400 includes:

an obtaining module 1401, configured to obtain a plurality of first tracks and a second track, where each first track is a flat-layer track located on an indoor horizontal layer, the second track is a cross-layer track located between different indoor horizontal layers, each first track includes a plurality of first track points, the second track includes a plurality of second track points, each first track point and each second track point include wireless signal information at locations of the first track point and the second track point respectively, and a first wireless signal information similarity between each first track point and each second track point is less than a first threshold.

For descriptions of the obtaining module 1401, refer to descriptions of operation 101. Details are not described herein again.

The apparatus further includes: a layering module 1402, configured to perform layering on the plurality of first tracks based on a second wireless signal information similarity between the plurality of first track points included in the plurality of first tracks, to obtain a layering result, where the layering result includes a plurality of horizontal layers and a first track included on each horizontal layer, and first tracks whose second wireless signal information similarity is greater than a second threshold are grouped into a same horizontal layer.

For descriptions of the layering module 1402, refer to descriptions of operation 102. Details are not described herein again.

The apparatus further includes: a map construction module 1403, configured to construct an indoor map based on the layering result.

For descriptions of the map construction module 1403, refer to descriptions of operation 103. Details are not described herein again.

Crowdsourcing data is triggered in a random mode without being perceived by a user. Therefore, originally collected crowdsourcing data is indoor and outdoor data, a flat-layer track, a cross-layer track, and various behavioral states. The difficulty of track layering lies in mixed layers of tracks. In an indoor scenario, such as shopping malls, there are a large number of elevators, escalators, and staircases between floors and a large hollow area. Due to these factors, radio frequency signals such as Wi-Fi signals are transmitted between the floors without obstacles. Therefore, a fingerprint similarity between tracks of adjacent floors in these areas cannot be distinguished, resulting in layer mixing. In this embodiment of this application, because wireless signals of the first track points participating in the layering and the track points of the cross-layer track differ greatly, that is, track points near the cross-layer track are not used for layering, tracks on different planes are not incorrectly identified as tracks on a same layer, thereby improving accuracy of track layering.

In an embodiment, each second track point further includes acceleration information and a time at a location of the second track point, and an acceleration of the second track in a time sequence of the time changes from a first state to a second state and then to a third state.

The first state is an increased state in which a change rate is greater than a threshold, the second state is a steady state in which the change rate is less than the threshold, and the third state is a decreased state in which the change rate is greater than the threshold.

The first state is a decreased state in which a change rate is greater than a threshold, the second state is a steady state in which the change rate is less than the threshold, and the third state is an increased state in which the change rate is greater than the threshold.

When a user crosses floors, for example, by taking an escalator or an elevator, an accelerometer has an obvious change in an upward and downward process. In the upward process, the accelerometer has an obvious process of first increasing, then being steady, and finally decreasing, while the downward process is the opposite. Therefore, a cross-layer track can be effectively identified by detecting a change characteristic of the acceleration.

In an embodiment, the wireless signal information indicates strength of a wireless signal received at a location and an identifier of a network device that sends the wireless signal.

The wireless signal strength may also be referred to as received signal strength (RSS), and specifically refers to a received wideband power on a channel bandwidth received by a terminal, in a unit of dBm. The value is a relative value, and is related to receive antenna quality of the terminal, surrounding environmental link blocking, a distance between the terminal and a signal transmit source, and the like.

In an embodiment, the obtaining module 1401 is further configured to:

obtain a plurality of initial tracks, where each initial track includes a plurality of track points, each track point includes wireless signal information received at a location of the track point, and each initial track is a flat-layer track located on the indoor horizontal layer; and determine that a track point, among the plurality of track points included in the plurality of initial tracks, whose wireless signal information similarity to that of each second track point is less than the first threshold is the first track point, to obtain the first track.

Because wireless signals of the first track points participating in the layering and the track points of the cross-layer track differ greatly, that is, track points near the cross-layer track are not used for layering, tracks on different planes are not incorrectly identified as tracks on a same layer, thereby improving accuracy of track layering.

In an embodiment, the obtaining module 1401 is further configured to:

obtain a third track point, where the third track point includes wireless signal information and GPS information at a location of the third track point, a wireless signal information similarity between the third track point and a target track point in the plurality of first track points is greater than a third threshold, the GPS information indicates an absolute location of the target track point, and the target track point further includes a relative location in the plurality of first tracks; and determine a location conversion relationship based on the absolute location and the relative location, and determine, based on the location conversion relationship, absolute locations of a plurality of first track points included in each first track.

In an existing method, absolute coordinate mapping is mainly implemented based on an indoor map. Currently, there is no indoor map for many indoor scenarios. Consequently, the existing method is invalid, and cannot be applied and deployed on a large scale. In this embodiment of this application, absolute coordinates of a 3D indoor fingerprint map are determined based on matching between a track point at an entrance/exit and an indoor estimation point, without depending on an indoor map. This is highly universal and has high precision, and meets a capability of large-scale commercial deployment.

In an embodiment, the obtaining module 1401 is specifically configured to:

obtain a plurality of first candidate track points, and confidence and an indoor/outdoor state of each first candidate track point, where each first candidate track point includes wireless signal information; and compare wireless signal similarities between the plurality of first candidate track points and the plurality of first track points based on the confidence the indoor/outdoor state, and the included wireless signal information of each first candidate track point, to determine, from the plurality of candidate track points, M first candidate track points whose wireless signal similarities are greater than the threshold, where each of the first candidate track points is in an outdoor state and the confidence is greater than the threshold, the M first candidate track points include the third track point, and M is a positive integer.

In an embodiment, the obtaining module 1401 is specifically configured to:

obtain a plurality of second candidate track points, where each second candidate track point includes wireless signal information and is in an indoor-outdoor switching state;

compare wireless signal similarities between the plurality of second candidate track points and the plurality of first track points included on each horizontal layer, to determine, from the plurality of first track points included on each horizontal layer, a second candidate track point whose wireless signal similarity is greater than the threshold; and determine, based on a quantity of second candidate track points determined on each horizontal layer, an absolute floor of a horizontal layer with a largest quantity of the determined second candidate track points.

In an embodiment, the plurality of second track points included in the second track further include track direction information, and the floor determining module is further configured to:

determine an upper-floor and lower-floor relationship between the horizontal layers in the layering result based on upward and downward track information indicated by the second track; and determine an absolute floor of each horizontal layer in the layering result based on the absolute floor of the horizontal layer with the largest quantity of the determined second candidate track points and the upper-floor and lower-floor relationship.

In an embodiment, based on a generated 3D relative skeleton topology and an entrance/exit fingerprint library, matching may be first performed between each layer in the 3D skeleton and the entrance/exit fingerprint library, to generate a matching relationship matrix, then sorting is performed based on the matching relationship matrix, a floor that is most matched with the entrance/exit fingerprint library is determined as an absolute floor 1, and then an absolute floor number of each layer is updated based on the floor sorting relationship, so that absolute mapping of the 3D skeleton floor is implemented without depending on an indoor map.

Figure 15:
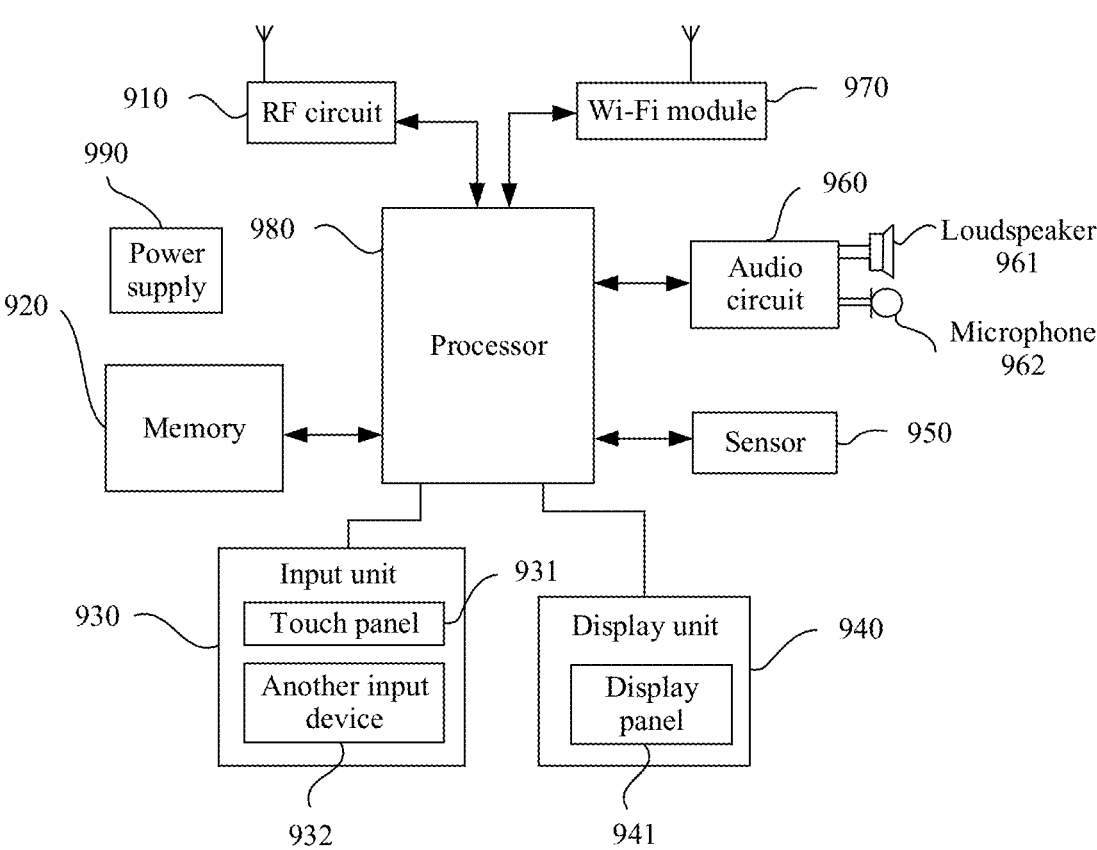
FIG. 15 is a schematic diagram of a structure of a terminal according to an embodiment of this application.

FIG. 15 is a schematic diagram of an embodiment of a terminal according to an embodiment of this application. The terminal is described by using a mobile phone as an example. FIG. 15 is a block diagram of a partial structure of the mobile phone related to the terminal according to this embodiment of this application. Refer to FIG. 15. The mobile phone includes components such as a radio frequency (RF) circuit 910, a memory 920, an input unit 930, a display unit 940, a sensor 950, an audio circuit 960, a wireless fidelity (Wi-Fi) module 970, a processor 980, and a power supply 990. A person skilled in the art may understand that the structure of the mobile phone shown in FIG. 15 does not constitute a limitation on the mobile phone. The mobile phone may include more or fewer components than those shown in the figure, or may include a combination of some components, or may include different component arrangements.

Each component of the mobile phone is specifically described below with reference to FIG. 15.

The RF circuit 910 may be configured to: send and receive a signal in an information sending or receiving process or a call process, and in particular, after receiving downlink information of a base station, send the downlink information to the processor 980 for processing; and in addition, send uplink data to the base station. Generally, the RF circuit 910 includes but is not limited to an antenna, at least one amplifier, a transceiver, a coupler, a low noise amplifier (LNA), and a duplexer. In addition, the RF circuit 910 may further communicate with a network and another device through wireless communication. The wireless communication may use any communication standard or protocol, including but not limited to a global system for mobile communications (GSM), a general packet radio service (GPRS), code division multiple access (CDMA), wideband code division multiple access (WCDMA), long term evolution (LTE), an e-mail, a short messaging service (SMS), and the like.

Figure 18:
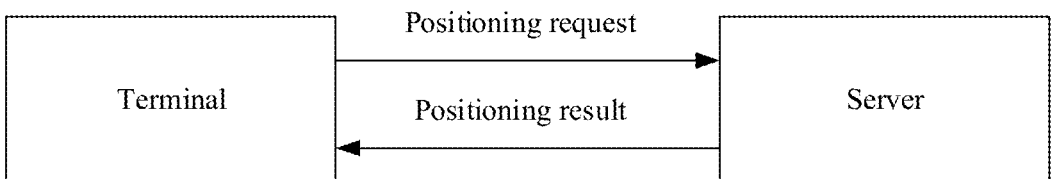
FIG. 18 is a schematic diagram of a system according to an embodiment of this application.

The terminal may exchange data with a server on a cloud side via the RF circuit 910. Specifically, the terminal may send positioning request information (for example, including a location point collected by the terminal, where the location point may include wireless signal information collected at the location) to the cloud server. The cloud server may determine a positioning result of the terminal based on the positioning request information and the indoor map generated in the foregoing embodiment, and send the positioning result to the terminal. In this way, the terminal may receive the positioning result via the RF circuit 910, and implement a corresponding function based on the positioning result (for details, refer to FIG. 18).

The memory 920 may be configured to store a software program and a module. The processor 980 performs, by running the software program and the module that are stored in the memory 920, various functional applications of the mobile phone and data processing. The memory 920 may mainly include a program storage area and a data storage area. The program storage area may store an operating system, an application required by at least one function (for example, a sound playback function and an image playback function), and the like. The data storage area may store data (such as audio data and a phone book) created based on use of a mobile phone, and the like. In addition, the memory 920 may include a high-speed random access memory, and may further include a non-volatile memory, such as at least one magnetic disk storage component, a flash memory component, or another volatile solid-state storage component.

The memory of the terminal may also store the indoor map generated in the foregoing embodiment. The terminal may determine a positioning result of the terminal based on the collected location point and the indoor map, and implement a corresponding function based on the positioning result.

The input unit 930 may be configured to receive input numeral or character information, and generate key signal input related to user settings and function control of the mobile phone. Specifically, the input unit 930 may include a touch panel 931 and another input device 932. The touch panel 931, also referred to as a touchscreen, may collect a touch operation of a user on or near the touch panel 931 (for example, an operation of the user on the touch panel 931 or near the touch panel 931 by using any proper object or accessory such as a finger or a stylus), and drive a corresponding connected apparatus according to a preset program. Optionally, the touch panel 931 may include two parts: a touch detection apparatus and a touch controller. The touch detection apparatus detects a touch position of the user, detects a signal generated by a touch operation, and transmits the signal to the touch controller. The touch controller receives touch information from the touch detection apparatus, converts the touch information into coordinates of a touch point, then sends the coordinates of the touch point to the processor 980, and can receive and execute a command sent by the processor 980. In addition, the touch panel 931 may be implemented by using a plurality of types, such as a resistive type, a capacitive type, an infrared ray, and a surface acoustic wave. In addition to the touch panel 931, the input unit 930 may further include the another input device 932. Specifically, the another input device 932 may include but is not limited to one or more of a physical keyboard, a function button (such as a volume control button or a power button), a trackball, a mouse, a joystick, and the like.

The display unit 940 may be configured to display information input by the user or information provided for the user, and various menus of the mobile phone. The display unit 940 may include a display panel 941. Optionally, a form such as a liquid crystal display (LCD) and an organic light-emitting diode (OLED) may be used to configure the display panel 941. Further, the touch panel 931 may cover the display panel 941. When detecting a touch operation on or near the touch panel 931, the touch panel 931 transmits the touch operation to the processor 980 to determine a type of a touch event, and then the processor 980 provides corresponding visual output on the display panel 941 according to the type of the touch event. In FIG. 15, the touch panel 931 and the display panel 941 are used as two independent components to implement input and output functions of the mobile phone. However, in some embodiments, the touch panel 931 and the display panel 941 may be integrated to implement the input and output functions of the mobile phone.

The mobile phone may further include at least one sensor 950, for example, a light sensor, a motion sensor, or another sensor. Specifically, the light sensor may include an ambient light sensor and a proximity sensor. The ambient light sensor may adjust luminance of the display panel 941 according to brightness of the ambient light. The proximity sensor may turn off the display panel 941 and/or backlight when the mobile phone moves to an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between a landscape mode and a vertical mode, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the mobile phone. Details are not described herein.

The audio circuit 960, a loudspeaker 961, and a microphone 962 may provide audio interfaces between the user and the mobile phone. The audio circuit 960 may transmit, to the loudspeaker 961, a received electrical signal obtained after audio data conversion, and the loudspeaker 961 converts the electrical signal to a sound signal for output. In another aspect, a collected sound signal is converted by the microphone 962 to an electrical signal and then is received by the audio circuit 960 and converted to audio data, and the audio data is output to the processor 980 for processing and then is sent to, for example, another mobile phone via the RF circuit 910, or the audio data is output to the memory 920 for further processing.

Wi-Fi is a short-distance wireless transmission technology. The mobile phone may help, by using the Wi-Fi module 970, the user send and receive an email, browse a web page, access streaming media, and the like. The Wi-Fi module 970 provides wireless broadband internet access for the user. Although FIG. 15 shows the Wi-Fi module 970, it may be understood that the Wi-Fi module 970 is not mandatory included in the mobile phone. The Wi-Fi module 970 may be omitted based on a requirement without changing the scope of essence of the present invention.

The processor 980 is a control center of the mobile phone and is connected to each part of the entire mobile phone through various interfaces and lines. By running or executing the software program and/or the module that is stored in the memory 920 and invoking data stored in the memory 920, the processor 980 performs various functions of the mobile phone and data processing, to perform overall monitoring on the mobile phone. Optionally, the processor 980 may include one or more processing units. Preferably, an application processor and a modem processor may be integrated into the processor 980. The application processor mainly processes an operating system, a user interface, an application program, and the like, and the modem processor mainly processes wireless communication. It may be understood that the modem processor may not be integrated into the processor 980.

The mobile phone further includes the power supply 990 (such as a battery) for supplying power to each component. Preferably, the power supply may be logically connected to the processor 980 by using a power management system, thereby implementing functions such as charging, discharging, and power consumption management by using the power management system.

Although not shown, the mobile phone may further include a camera, a Bluetooth module, and the like. Details are not described herein.

The operations performed by the terminal in the foregoing method embodiment may be based on the terminal structure shown in FIG. 15. Details are not described herein again.

Figure 16:
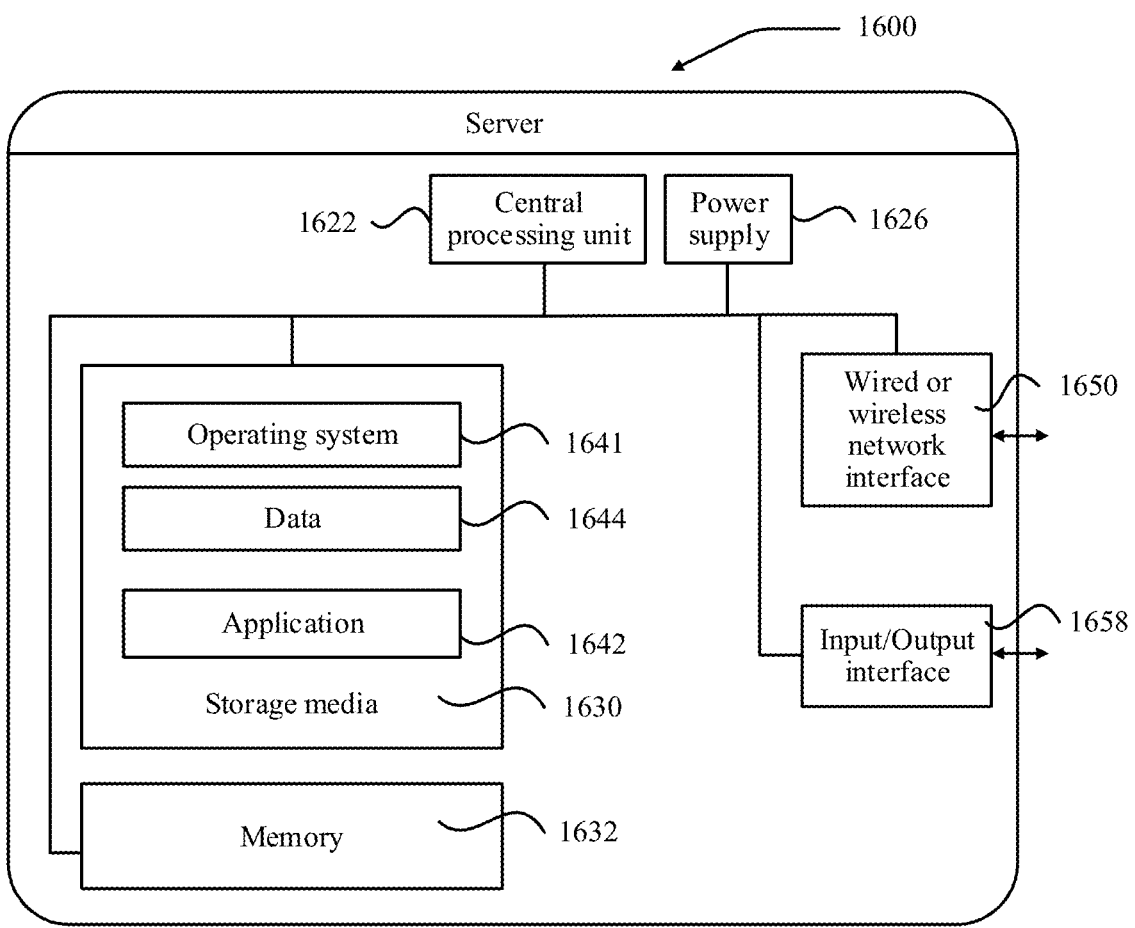
FIG. 16 is a schematic diagram of a structure of a server according to an embodiment of this application.

An embodiment of this application further provides a server. FIG. 16 is a schematic diagram of a structure of a server according to an embodiment of this application. Specifically, the server may vary greatly due to different configurations or performance, and may include one or more central processing units (CPU) 1622 (for example, one or more processors) and a memory 1632, and one or more storage media 1630 (for example, one or more mass storage devices) that stores an application 1642 or data 1644. The memory 1632 and the storage media 1630 may be transitory storage or persistent storage. A program stored in the storage media 1630 may include one or more modules (not shown in the figure), and each module may include a series of instruction operations on a training device. Further, the central processing unit 1622 may be configured to communicate with the storage medium 1630, and perform, in the server 1600, a series of instruction operations in the storage media 1630.

The server 1600 may further include one or more power supplies 1626, one or more wired or wireless network interfaces 1650, one or more input/output interfaces 1658, and/or one or more operating systems 1641, for example, Windows Server™, Mac OS X™, Unix™, Linux™, and FreeBSD™.

An embodiment of this application further provides a computer program product. When the computer program product runs on a computer, the computer is enabled to perform the method for constructing an indoor map described in the foregoing embodiment.

After generating the indoor map, the server may further provide, for the terminal based on the indoor map, a cloud service used to implement indoor positioning. For a specific interaction process, refer to the descriptions in the foregoing embodiment. Details are not described herein again.

An embodiment of this application further provides a computer-readable storage medium. The computer-readable storage medium stores a program used for signal processing. When the program is run on a computer, the computer is enabled to perform the method for constructing an indoor map described in the foregoing embodiment.

The apparatus for constructing an indoor map in this embodiment of this application may be specifically a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in the execution device performs the method for constructing an indoor map described in the foregoing embodiment, or a chip in the training device performs the method for constructing an indoor map described in the foregoing embodiment. Optionally, the storage unit is a storage unit in the chip, for example, a register or a cache, or the storage unit may be a storage unit in the wireless access device but outside the chip, for example, a read-only memory (ROM) or another type of static storage device capable of storing static information and instructions, or a random access memory (RAM).

Figure 17:
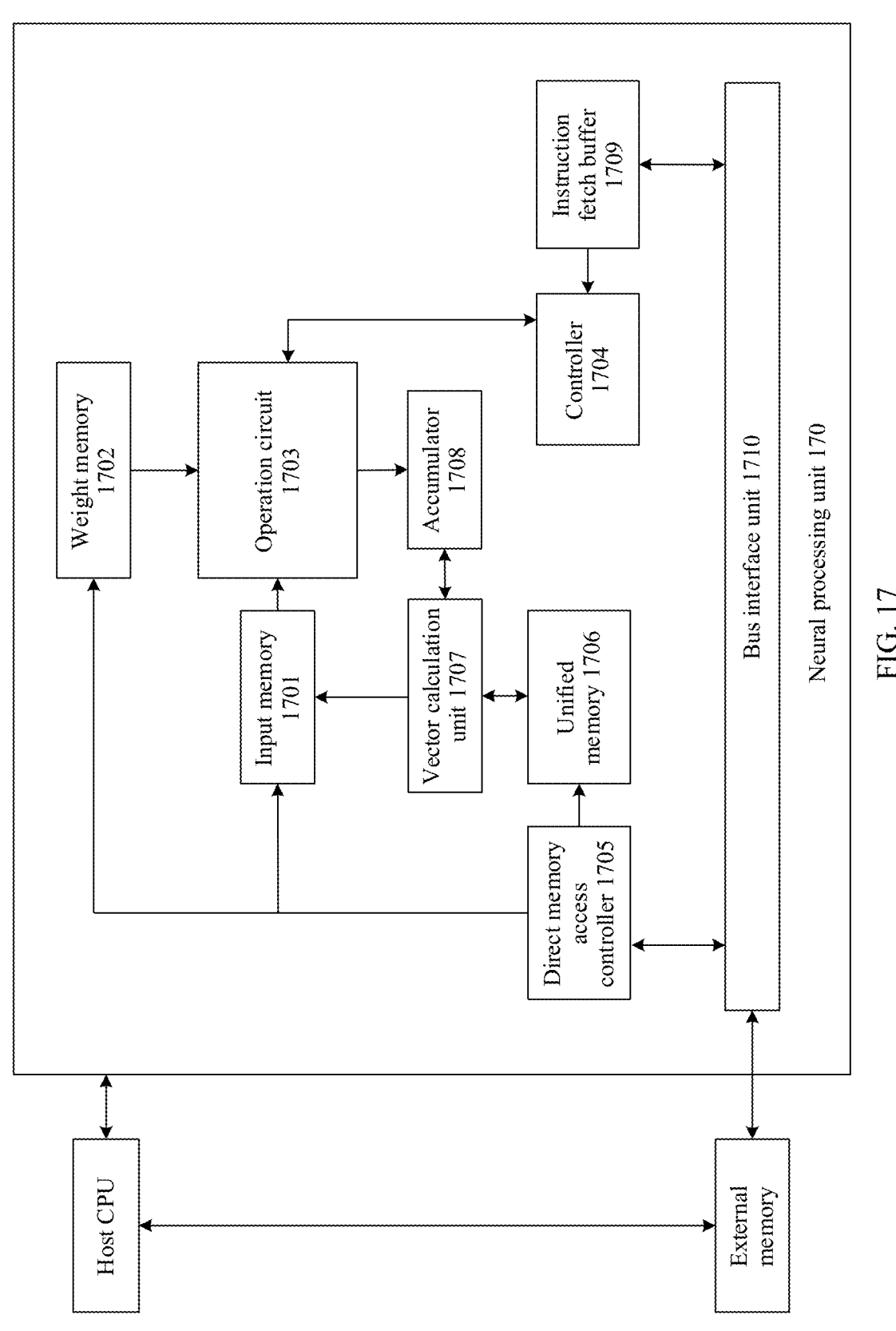
FIG. 17 is a schematic diagram of a structure of a chip according to an embodiment of this application.

Specifically, FIG. 17 is a schematic diagram of a structure of a chip according to an embodiment of this application. The chip may be represented as a neural processing unit NPU 170. The NPU 170 is mounted to a host CPU as a coprocessor, and the host CPU assigns a task. A core part of the NPU is an operation circuit 1703. The operation circuit 1703 is controlled by a controller 1704 to extract matrix data from a memory and perform a multiplication operation.

In some implementations, the operation circuit 1703 includes a plurality of process engines (PEs) inside. In some implementations, the operation circuit 1703 is a two-dimensional systolic array. The operation circuit 1703 may alternatively be a one-dimensional systolic array or another electronic circuit capable of performing mathematical operations such as multiplication and addition. In some implementations, the operation circuit 1703 is a general-purpose matrix processor.

For example, it is assumed that there are an input matrix A, a weight matrix B, and an output matrix C. The operation circuit fetches, from a weight memory 1702, data corresponding to the matrix B, and buffers the data on each PE in the operation circuit. The operation circuit fetches data of the matrix A from an input memory 1701, performs a matrix operation on the matrix B and the data of the matrix A, and stores, in an accumulator 1708, a partial result or a final result of an obtained matrix.

A unified memory 1706 is configured to store input data and output data. The weight data is directly transferred to the weight memory 1702 by using a direct memory access controller (DMAC) 1705. The input data is also transferred to the unified memory 1706 through the DMAC.

A BIU is a bus interface unit, namely, a bus interface unit 1710, and is used for interaction between an AXI bus and the DMAC and between the AXI bus and an instruction fetch buffer (IFB) 1709.

The bus interface unit (BIU) 1710 is used by the instruction fetch buffer 1709 to obtain instructions from an external memory, and is further used by the direct memory access controller 1705 to obtain original data of the input matrix A or the weight matrix B from the external memory.

The DMAC is mainly configured to transfer input data in the external DDR memory to the unified memory 1706, or transfer weight data to the weight memory 1702, or transfer input data to the input memory 1701.

A vector calculation unit 1707 includes a plurality of operation processing units. If required, further processing is performed on an output of the operation circuit, for example, vector multiplication, vector addition, an exponential operation, a logarithmic operation, or size comparison. The vector calculation unit is mainly configured to perform network calculation, such as batch normalization, pixel-level summation, and upsampling on a feature plane, at a non-convolutional/fully connected layer in a neural network.

In some implementations, a processed vector output by the vector calculation unit 1707 can be stored in the unified memory 1706. For example, the vector calculation unit 1707 may apply a linear function or a non-linear function to the output of the operation circuit 1703, for example, perform linear interpolation on a feature plane extracted at a convolutional layer. For another example, the linear function or the non-linear function is applied to a vector of an accumulated value to generate an activation value. In some implementations, the vector calculation unit 1707 generates a normalized value, a value obtained by performing pixel-level summation, or a combination thereof. In some implementations, the output processed vector can be used as an activation input to the operation circuit 1703. For example, the processed output vector can be used at a subsequent layer in the neural network.

The instruction fetch buffer 1709 connected to the controller 1704 is configured to store instructions used by the controller 1704.

The unified memory 1706, the input memory 1701, the weight memory 1702, and the instruction fetch buffer 1709 are all on-chip memories. The external memory is private for a hardware architecture of the NPU.

The processor mentioned above may be a general-purpose central processing unit, a microprocessor, an ASIC, or one or more integrated circuits configured to control program execution of related steps of the method for constructing an indoor map described in the foregoing embodiment.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiment provided by this application, connection relationships between modules indicate that the modules have communication connections with each other, which may be specifically implemented as one or more communication buses or signal cables.

Based on the descriptions of the foregoing implementations, a person skilled in the art may clearly understand that this application may be implemented by using software in addition to necessary universal hardware, or certainly may be implemented by using dedicated hardware, including a dedicated integrated circuit, a dedicated CPU, a dedicated memory, a dedicated component, and the like. Generally, all functions that can be performed by a computer program can be easily implemented by using corresponding hardware. Moreover, there may be various specific hardware structures, such as an analog circuit, a digital circuit, and a dedicated circuit, used to achieve a same function. However, in this application, a software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods described in embodiments of this application.

All or some of the foregoing embodiments may be implemented by software, hardware, firmware, or any combination thereof. When software is used to implement embodiments, all or a part of embodiments may be implemented in a form of a computer program product.

The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

What is claimed is:

1. A method for constructing an indoor map, comprising:
obtaining a plurality of first tracks and a second track, wherein each first track is a flat-layer track located on an indoor horizontal layer, the second track is a cross-layer track located between different indoor horizontal layers, each first track comprises a plurality of first track points, the second track comprises a plurality of second track points, each first track point and each second track point comprise wireless signal information at locations of the first track point and the second track point respectively, and a first wireless signal information similarity between each first track point and each second track point is less than a first threshold;
performing layering on the plurality of first tracks based on a second wireless signal information similarity between the plurality of first track points comprised in the plurality of first tracks, to obtain a layering result, wherein the layering result comprises a plurality of horizontal layers and at least one of the plurality of first tracks comprised on each horizontal layer, and first tracks whose second wireless signal information similarity is greater than a second threshold are grouped into a same horizontal layer; and
constructing the indoor map based on the layering result and the second track whereby the layering result excludes track points near the second track being the cross-layer track.

2. The method according to claim 1, wherein each second track point further comprises acceleration information and a time at a location of the second track point, and an acceleration of the second track in a time sequence of the time changes from a first state to a second state and then to a third state, wherein the first state is an increased state in which a change rate is greater than a threshold, the second state is a steady state in which the change rate is less than the threshold, and the third state is a decreased state in which the change rate is greater than the threshold; or the first state is a decreased state in which a change rate is greater than a threshold, the second state is a steady state in which the change rate is less than the threshold, and the third state is an increased state in which the change rate is greater than the threshold.

3. The method according to claim 1, wherein the wireless signal information indicates strength of a wireless signal received at a location and an identifier of a network device that sends the wireless signal.

4. The method according to claim 1, wherein the obtaining the plurality of first tracks comprises:

obtaining a plurality of initial tracks, wherein each initial track comprises a plurality of track points, each track point comprises wireless signal information received at a location of the track point, and each initial track is a flat-layer track located on the indoor horizontal layer; and determining that at least one of the plurality of track points is comprised in the plurality of initial tracks, whose wireless signal information similarity to that of each second track point is less than the first threshold is the first track point, to obtain the first track.

5. The method according to claim 1, further comprising:

obtaining a third track point, wherein the third track point comprises wireless signal information and GPS information at a location of the third track point, a wireless signal information similarity between the third track point and a target track point in the plurality of first track points is greater than a third threshold, the GPS information indicates an absolute location of the target track point, and the target track point further comprises a relative location in the plurality of first tracks; and determining a location conversion relationship based on the absolute location and the relative location, and determining absolute locations of the plurality of first track points based on the location conversion relationship.

6. The method according to claim 5, wherein the obtaining the third track point comprises: obtaining a plurality of first candidate track points, and confidence and an indoor/outdoor state of each first candidate track point, wherein each first candidate track point comprises wireless signal information; and comparing wireless signal similarities between the plurality of first candidate track points and the plurality of first track points based on the confidence, the indoor/outdoor state, and the comprised wireless signal information of each first candidate track point, to determine, from the plurality of first candidate track points, M first candidate track points whose wireless signal similarities are greater than a threshold, wherein each of the M first candidate track points is in an outdoor state and the confidence is greater than the threshold, the M first candidate track points comprise the third track point, and M is a positive integer.

7. The method according to claim 1, further comprising:
obtaining a plurality of second candidate track points, wherein each second candidate track point comprises wireless signal information and is in an indoor-outdoor switching state;
comparing wireless signal similarities between the plurality of second candidate track points and the plurality of first track points comprised on each horizontal layer, to determine, from the plurality of first track points comprised on each horizontal layer, a second candidate track point whose wireless signal similarity is greater than a threshold; and
determining, based on a quantity of second candidate track points determined for each of the horizontal layers, an absolute floor number of a horizontal layer with a largest quantity of determined second candidate track points.

8. The method according to claim 7, further comprising:
determining an upper-floor and lower-floor relationship between the horizontal layers in the layering result based on upward and downward track information indicated by the second track; and
determining the absolute floor number of each horizontal layer in the layering result based on the absolute floor number of the horizontal layer with the largest quantity of determined second candidate track points and the upper-floor and lower-floor relationship.

9. A device comprising:
a memory configured to store instructions; and
one or more processors coupled to the memory and configured to execute the instructions to cause the device to:
obtain a plurality of first tracks and a second track, wherein each first track is a flat-layer track located on an indoor horizontal layer, the second track is a cross-layer track located between different indoor horizontal layers, each first track comprises a plurality of first track points, the second track comprises a plurality of second track points, each first track point and each second track point comprise wireless signal information at locations of the first track point and the second track point respectively, and a first wireless signal information similarity between each first track point and each second track point is less than a first threshold;
perform layering on the plurality of first tracks based on a second wireless signal information similarity between the plurality of first track points comprised in the plurality of first tracks, to obtain a layering result, wherein the layering result comprises a plurality of horizontal layers and at least one of the plurality of first tracks comprised on each horizontal layer, and first tracks whose second wireless signal information similarity is greater than a second threshold are grouped into a same horizontal layer; and
construct an indoor map based on the layering result and the second track whereby the layering result excludes track points near the second track being the cross-layer track.

10. The device according to claim 9, wherein each second track point further comprises acceleration information and a time at a location of the second track point, and an acceleration of the second track in a time sequence of the time changes from a first state to a second state and then to a third state, wherein
the first state is an increased state in which a change rate is greater than a threshold, the second state is a steady state in which the change rate is less than the threshold, and the third state is a decreased state in which the change rate is greater than the threshold; or
the first state is a decreased state in which a change rate is greater than a threshold, the second state is a steady state in which the change rate is less than the threshold, and the third state is an increased state in which the change rate is greater than the threshold.

11. The device according to claim 9, wherein the wireless signal information indicates strength of a wireless signal received at a location and an identifier of a network device that sends the wireless signal.

12. The device according to claim 9, wherein when obtaining the plurality of first tracks, the instructions, when executed by the one or more processors, further cause the device to:
obtain a plurality of initial tracks, wherein each initial track comprises a plurality of track points, each track point comprises wireless signal information received at a location of the track point, and each initial track is a flat-layer track located on the indoor horizontal layer; and
determine that at least one of the plurality of track points is comprised in the plurality of initial tracks, whose wireless signal information similarity to that of each second track point is less than the first threshold is the first track point, to obtain the first track.

13. The device according to claim 9, wherein the instructions, when executed by the one or more processors, further cause the device to:
obtain a third track point, wherein the third track point comprises wireless signal information and GPS information at a location of the third track point, a wireless signal information similarity between the third track point and a target track point in the plurality of first track points is greater than a third threshold, the GPS information indicates an absolute location of the target track point, and the target track point further comprises a relative location in the plurality of first tracks; and
determine a location conversion relationship based on the absolute location and the relative location, and determining absolute locations of the plurality of first track points based on the location conversion relationship.

14. The device according to claim 13, wherein the instructions, when executed by the one or more processors, further cause the device to: obtain a plurality of first candidate track points, and confidence and an indoor/outdoor state of each first candidate track point, wherein each first candidate track point comprises wireless signal information; and
compare wireless signal similarities between the plurality of first candidate track points and the plurality of first track points based on the confidence, the indoor/outdoor state, and the comprised wireless signal information of each first candidate track point, to determine, from the plurality of first candidate track points, M first candidate track points whose wireless signal similarities are greater than a threshold, wherein each of the M first candidate track points is in an outdoor state and the confidence is greater than the threshold, the M first candidate track points comprise the third track point, and M is a positive integer.

15. The device according to claim 9, wherein the instructions, when executed by the one or more processors, further cause the device to:
obtain a plurality of second candidate track points, wherein each second candidate track point comprises wireless signal information and is in an indoor-outdoor switching state;

compare wireless signal similarities between the plurality of second candidate track points and the plurality of first track points comprised on each horizontal layer, to determine, from the plurality of first track points comprised on each horizontal layer, a second candidate track point whose wireless signal similarity is greater than a threshold; and determine, based on a quantity of second candidate track points determined for each of the horizontal layers, an absolute floor number of a horizontal layer with a largest quantity of determined second candidate track points.

16. The device according to claim 15, wherein the instructions, when executed by the one or more processors, further cause the device to:

determine an upper-floor and lower-floor relationship between the horizontal layers in the layering result based on upward and downward track information indicated by the second track; and determine the absolute floor number of each horizontal layer in the layering result based on the absolute floor number of the horizontal layer with the largest quantity of determined second candidate track points and the upper-floor and lower-floor relationship.

17. A computer program product comprising computer-executable instructions stored on a non-transitory computer-readable storage medium, the computer-executable instructions when executed by one or more processors of an apparatus, cause the apparatus to:

obtain a plurality of first tracks and a second track, wherein each first track is a flat-layer track located on an indoor horizontal layer, the second track is a cross-layer track located between different indoor horizontal layers, each first track comprises a plurality of first track points, the second track comprises a plurality of second track points, each first track point and each second track point comprise wireless signal information at locations of the first track point and the second track point respectively, and a first wireless signal information similarity between each first track point and each second track point is less than a first threshold;

perform layering on the plurality of first tracks based on a second wireless signal information similarity between the plurality of first track points comprised in the plurality of first tracks, to obtain a layering result, wherein the layering result comprises a plurality of horizontal layers and at least one of the plurality of first tracks comprised on each horizontal layer, and first tracks whose second wireless signal information similarity is greater than a second threshold are grouped into a same horizontal layer; and construct an indoor map based on the layering result and the second track whereby the layering result excludes track points near the second track being the cross-layer track.

18. The computer program product of claim 17, wherein each second track point further comprises acceleration information and a time at a location of the second track point, and an acceleration of the second track in a time sequence of the time changes from a first state to a second state and then to a third state, wherein the first state is an increased state in which a change rate is greater than a threshold, the second state is a steady state in which the change rate is less than the threshold, and the third state is a decreased state in which the change rate is greater than the threshold; or the first state is a decreased state in which a change rate is greater than a threshold, the second state is a steady state in which the change rate is less than the threshold, and the third state is an increased state in which the change rate is greater than the threshold.

19. The computer program product of claim 17, wherein the wireless signal information indicates strength of a wireless signal received at a location and an identifier of a network device that sends the wireless signal.

20. The computer program product of claim 17, wherein the computer-executable instructions when executed by the one or more processors of the apparatus, further cause the apparatus to:

obtain a plurality of initial tracks, wherein each initial track comprises a plurality of track points, each track point comprises wireless signal information received at a location of the track point, and each initial track is a flat-layer track located on the indoor horizontal layer; and determine that a track point, among the plurality of track points comprised in the plurality of initial tracks, whose wireless signal information similarity to that of each second track point is less than the first threshold is the first track point, to obtain the first track.

\* \* \* \* \*